(12) United States Patent
Hoffman et al.

(10) Patent No.: US 7,067,195 B2
(45) Date of Patent: Jun. 27, 2006

(54) COATINGS HAVING LOW EMISSIVITY AND LOW SOLAR REFLECTANCE

(75) Inventors: Wayne L. Hoffman, Spring Green, WI (US); Eric Eby, Lone Rock, WI (US)

(73) Assignee: Cardinal CG Company, Eden Prairie, MN (US)

( * ) Notice: Subject to any disclaimer, the term of this patent is extended or adjusted under 35 U.S.C. 154(b) by 0 days.

(21) Appl. No.: 10/423,838

(22) Filed: Apr. 25, 2003

(65) Prior Publication Data

US 2003/0228472 A1    Dec. 11, 2003

Related U.S. Application Data

(60) Provisional application No. 60/411,031, filed on Sep. 16, 2002, provisional application No. 60/376,826, filed on Apr. 29, 2002.

(51) Int. Cl.
  *B32B 17/06*  (2006.01)
(52) U.S. Cl. .................. 428/432; 428/699; 428/701; 428/702; 428/428
(58) Field of Classification Search ............... 428/432, 428/433, 434, 699, 701, 702
  See application file for complete search history.

(56) References Cited

U.S. PATENT DOCUMENTS

| | | | |
|---|---|---|---|
| 2,207,656 A | 7/1940 | Cartwright et al. ............ 88/1 |
| 3,516,720 A | 6/1970 | Mauer ............................ 350/2 |
| 3,537,944 A | 11/1970 | Grubb et al. ................. 161/4 |
| 3,682,528 A | 8/1972 | Apfel et al. ................. 350/1 |
| 3,781,077 A | 12/1973 | Groth ............................ 350/1 |
| 3,978,272 A | 8/1976 | Donley ....................... 428/434 |
| 3,978,273 A | 8/1976 | Groth ......................... 428/434 |
| 3,990,784 A | 11/1976 | Gelber ........................ 350/166 |
| 4,098,956 A | 7/1978 | Blickensderfer et al. ..... 428/627 |
| 4,235,048 A | 11/1980 | Gillery ......................... 49/390 |
| 4,313,647 A | 2/1982 | Takazawa ..................... 350/164 |
| 4,327,967 A | 5/1982 | Groth .......................... 350/258 |
| 4,348,453 A | 9/1982 | Cohen .......................... 428/333 |
| 4,413,877 A | 11/1983 | Suzuki ......................... 350/1.7 |
| 4,440,822 A | 4/1984 | Gordon ........................ 428/216 |
| 4,462,883 A | 7/1984 | Hart ........................... 204/192 C |
| 4,487,197 A | 12/1984 | Hoyois ........................ 126/901 |
| 4,497,700 A | 2/1985 | Groth et al. ................ 204/192 P |
| 4,534,841 A | 8/1985 | Hartig ........................ 204/192 P |
| 4,548,691 A | 10/1985 | Dietrich ..................... 204/192 P |
| 4,583,815 A | 4/1986 | Taga et al. ................... 350/1.6 |
| 4,610,771 A | 9/1986 | Gillery ...................... 204/192.1 |
| 4,639,069 A | 1/1987 | Yatabe et al. ................ 350/1.7 |
| 4,735,488 A | 4/1988 | Rancourt et al. ........... 350/166 |
| 4,786,784 A | 11/1988 | Nikodem ..................... 219/543 |
| 4,790,922 A | 12/1988 | Huffer ....................... 204/192.27 |
| 4,806,220 A | 2/1989 | Finley ....................... 204/192.27 |
| 4,834,857 A | 5/1989 | Gillery ...................... 204/192.27 |
| 4,847,157 A | 7/1989 | Goodman ................... 428/426 |

(Continued)

FOREIGN PATENT DOCUMENTS

AU           48985           2/2001

(Continued)

*Primary Examiner*—Jennifer C. McNeil
*Assistant Examiner*—G. Blackwell
(74) *Attorney, Agent, or Firm*—Fredrikson & Byron P.A.

(57) ABSTRACT

The invention provides low solar reflectance, low-emissivity coatings. The invention provides a monolithic pane bearing a low solar reflectance, low-emissivity coating. Further, the invention provides an insulating glass unit bearing a low solar reflectance, low-emissivity coating. Finally, the invention provides methods of producing coated substrates by depositing low solar reflectance, low-emissivity coatings.

35 Claims, 10 Drawing Sheets

U.S. PATENT DOCUMENTS

| | | | | |
|---|---|---|---|---|
| 4,847,158 A | 7/1989 | Gillery | | 428/433 |
| 4,883,721 A | 11/1989 | Nalepka et al. | | 428/623 |
| 4,896,928 A | 1/1990 | Perilloux | | 350/1.6 |
| 4,898,789 A | 2/1990 | Finley | | 428/623 |
| 4,902,081 A | 2/1990 | Huffer | | 350/1.7 |
| 4,902,580 A | 2/1990 | Gillery | | 428/623 |
| 4,902,581 A | 2/1990 | Criss | | 428/627 |
| 4,919,778 A | 4/1990 | Dietrich | | 204/192.37 |
| 4,964,963 A | 10/1990 | Criss | | 204/192.27 |
| 4,971,843 A | 11/1990 | Michelotti et al. | | 428/34 |
| 4,985,312 A | 1/1991 | Furuya | | 428/627 |
| 4,996,105 A | 2/1991 | Oyama | | 428/336 |
| 4,997,013 A | 3/1991 | Peckels | | 141/95 |
| 5,055,358 A | 10/1991 | Livingston et al. | | 428/433 |
| 5,059,295 A | 10/1991 | Finley | | 204/192.27 |
| 5,059,458 A | 10/1991 | Goodall | | 428/34 |
| 5,073,451 A | 12/1991 | Iida et al. | | 428/336 |
| 5,087,525 A | 2/1992 | Goodman | | 428/428 |
| 5,110,662 A | 5/1992 | Depauw | | 428/192 |
| 5,112,693 A | 5/1992 | Gillery | | 428/432 |
| 5,173,800 A | 12/1992 | King | | 359/360 |
| 5,214,530 A | 5/1993 | Coombs et al. | | 359/359 |
| 5,216,542 A | 6/1993 | Szczyrbowski | | 359/588 |
| 5,229,881 A | 7/1993 | Day et al. | | 359/360 |
| 5,298,048 A | 3/1994 | Lingle | | 65/60.2 |
| 5,302,449 A | 4/1994 | Eby et al. | | 428/336 |
| 5,306,547 A | 4/1994 | Hood et al. | | 428/213 |
| 5,334,718 A | 8/1994 | Thomas et al. | | 546/118 |
| 5,337,191 A | 8/1994 | Austin | | 359/885 |
| 5,348,805 A | 9/1994 | Zagdoun | | 428/432 |
| 5,376,455 A | 12/1994 | Hartig | | 428/428 |
| 5,377,045 A | 12/1994 | Wolfe et al. | | 359/585 |
| 5,450,238 A | 9/1995 | Bjornard et al. | | 359/580 |
| 5,514,476 A | 5/1996 | Hartig | | 428/426 |
| 5,520,996 A | 5/1996 | Balian | | 428/216 |
| 5,543,229 A | 8/1996 | Ohsaki | | 428/432 |
| 5,552,180 A | 9/1996 | Finley | | 427/165 |
| 5,557,462 A | 9/1996 | Hartig et al. | | 359/585 |
| 5,563,734 A | 10/1996 | Wolfe | | 359/360 |
| 5,584,902 A | 12/1996 | Hartig | | 65/32.4 |
| 5,595,825 A | 1/1997 | Guiselin | | 428/428 |
| 5,635,287 A | 6/1997 | Balian | | 428/216 |
| 5,691,044 A | 11/1997 | Oyama et al. | | 428/216 |
| 5,693,415 A | 12/1997 | Zait | | 428/332 |
| 5,750,265 A | 5/1998 | Goodman | | 428/432 |
| 5,770,321 A | 6/1998 | Hartig et al. | | 428/622 |
| 5,776,603 A | 7/1998 | Zagdoun | | 428/336 |
| 5,780,149 A | 7/1998 | McCurdy | | 428/336 |
| 5,800,933 A | 9/1998 | Hartig et al. | | 428/622 |
| 5,821,001 A | 10/1998 | Arbab | | 428/623 |
| 5,837,361 A | 11/1998 | Glaser | | 428/216 |
| 5,891,556 A | 4/1999 | Anderson et al. | | 428/216 |
| 5,897,857 A | 4/1999 | Hillebrand et al. | | 424/703 |
| 5,897,957 A | 4/1999 | Goodman | | 428/432 |
| 5,902,505 A | 5/1999 | Finley | | 219/547 |
| 5,938,898 A | 8/1999 | Ando et al. | | 204/192.23 |
| 5,942,319 A | 8/1999 | Oyama et al. | | 428/216 |
| 5,942,338 A | 8/1999 | Arbab | | 428/623 |
| RE36,308 E | 9/1999 | Yang | | 359/585 |
| 5,948,538 A | 9/1999 | Brochot | | 428/432 |
| 5,952,084 A | 9/1999 | Anderson | | 428/212 |
| 5,965,246 A * | 10/1999 | Guiselin et al. | | 428/212 |
| 6,007,901 A | 12/1999 | Maschwitz | | 428/216 |
| 6,014,872 A | 1/2000 | Hartig et al. | | 65/58 |
| 6,020,077 A | 2/2000 | Schicht | | 428/622 |
| 6,030,671 A | 2/2000 | Yang | | 428/34 |
| 6,034,813 A | 3/2000 | Woodard et al. | | 359/360 |
| 6,042,934 A | 3/2000 | Guiselin | | 428/213 |
| 6,045,896 A * | 4/2000 | Boire et al. | | 428/216 |
| 6,048,621 A | 4/2000 | Gallego et al. | | 428/432 |
| 6,059,909 A | 5/2000 | Hartig et al. | | 156/109 |
| 6,060,178 A | 5/2000 | Krisko | | 428/627 |
| 6,074,730 A | 6/2000 | Laird | | 428/212 |
| 6,124,026 A | 9/2000 | McCurdy | | 428/216 |
| 6,132,881 A | 10/2000 | Hartig et al. | | 428/432 |
| 6,150,028 A | 11/2000 | Mazon | | 428/426 |
| 6,154,598 A | 11/2000 | Gavrilovic | | 385/141 |
| 6,159,607 A | 12/2000 | Hartig et al. | | 428/426 |
| 6,159,621 A | 12/2000 | Schicht | | 428/633 |
| 6,165,598 A | 12/2000 | Nelson | | 428/212 |
| 6,174,599 B1 | 1/2001 | Boire | | 428/336 |
| 6,188,512 B1 | 2/2001 | Woodard et al. | | 359/359 |
| 6,190,776 B1 | 2/2001 | Demiryont | | 428/434 |
| 6,210,784 B1 * | 4/2001 | Rondeau et al. | | 428/212 |
| 6,218,018 B1 | 4/2001 | McKown et al. | | 428/432 |
| 6,231,992 B1 | 5/2001 | Niebauer et al. | | 428/472 |
| 6,231,999 B1 | 5/2001 | Krisko | | 428/627 |
| 6,246,523 B1 | 6/2001 | Bradley, Jr. et al. | | 359/585 |
| 6,262,830 B1 | 7/2001 | Scalora | | 359/248 |
| 6,266,193 B1 | 7/2001 | Saif | | 359/582 |
| 6,274,244 B1 | 8/2001 | Finley | | 428/433 |
| 6,284,385 B1 | 9/2001 | Guillaumon | | 428/450 |
| 6,287,675 B1 | 9/2001 | Guiselin | | 428/213 |
| 6,306,525 B1 | 10/2001 | Schicht et al. | | 428/633 |
| 6,322,881 B1 | 11/2001 | Boire | | 428/216 |
| 6,335,142 B1 | 1/2002 | Quesnel et al. | | 430/275.1 |
| 6,337,124 B1 | 1/2002 | Amderson et al. | | 428/216 |
| 6,344,288 B1 | 2/2002 | Oyama et al. | | 428/701 |
| 6,355,334 B1 | 3/2002 | Rondeau | | 428/212 |
| 6,650,478 B1 | 11/2003 | DeBusk | | 359/585 |
| 6,838,159 B1 | 1/2005 | Eby | | 428/216 |
| 2001/0003628 A1 | 6/2001 | Demiryont | | 428/630 |
| 2001/0006734 A1 | 7/2001 | Demiryont | | 428/432 |
| 2001/0021540 A1 | 9/2001 | Woodward et al. | | 438/98 |
| 2001/0044032 A1 | 11/2001 | Guiselin | | 428/213 |
| 2001/0053439 A1 | 12/2001 | Guiselin | | 428/213 |
| 2002/0009601 A1 | 1/2002 | Stachowiak | | 428/432 |
| 2002/0016250 A1 | 2/2002 | Hayakawa | | 502/5 |
| 2002/0034641 A1 | 3/2002 | Ebisawa | | 428/426 |
| 2002/0037414 A1 | 3/2002 | Cunningham | | 428/412 |
| 2002/0037421 A1 | 3/2002 | Arnaud | | 428/472 |
| 2002/0045037 A1 | 4/2002 | Boire | | 428/216 |
| 2002/0136905 A1 | 9/2002 | Medwick | | 428/432 |
| 2003/0049464 A1 | 3/2003 | Glenn | | 428/432 |
| 2003/0148115 A1 | 8/2003 | Glenn | | 428/432 |
| 2003/0165693 A1 | 9/2003 | Hartig | | 428/426 |
| 2003/0165694 A1 | 9/2003 | Hartig | | 428/428 |
| 2003/0186064 A1 | 10/2003 | Murata | | 428/432 |
| 2004/0009356 A1 | 1/2004 | Medwick | | 428/432 |
| 2004/0016202 A1 | 1/2004 | Hoffman | | 52/786 |
| 2004/0071985 A1 | 4/2004 | Krisko | | 428/434 |
| 2004/0241457 A1 | 12/2004 | Macquart | | 428/432 |
| 2004/0247929 A1 | 12/2004 | Buhay | | 428/621 |
| 2005/0123772 A1 | 6/2005 | Coustet | | 428/432 |

FOREIGN PATENT DOCUMENTS

| | | |
|---|---|---|
| EP | 0341002 | 11/1989 |
| EP | 0847965 | 12/1997 |
| EP | 1044934 | 10/2000 |
| EP | 1329307 | 7/2003 |
| WO | WO 97/48649 | 12/1997 |
| WO | WO 99/58736 | 11/1999 |
| WO | WO 02/18132 | 3/2002 |
| WO | WO 02/26488 | 4/2002 |
| WO | WO 02/48065 | 6/2002 |
| WO | WO 03/074441 | 9/2003 |
| WO | WO 03/074442 | 9/2003 |

* cited by examiner

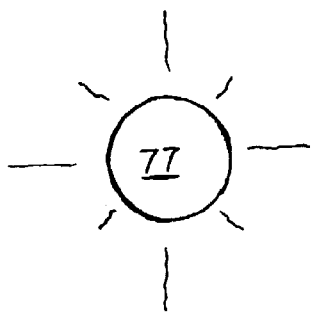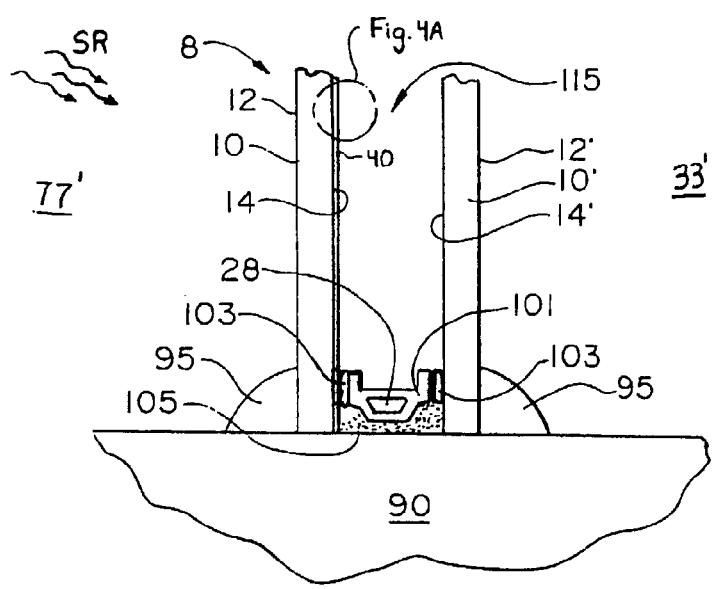

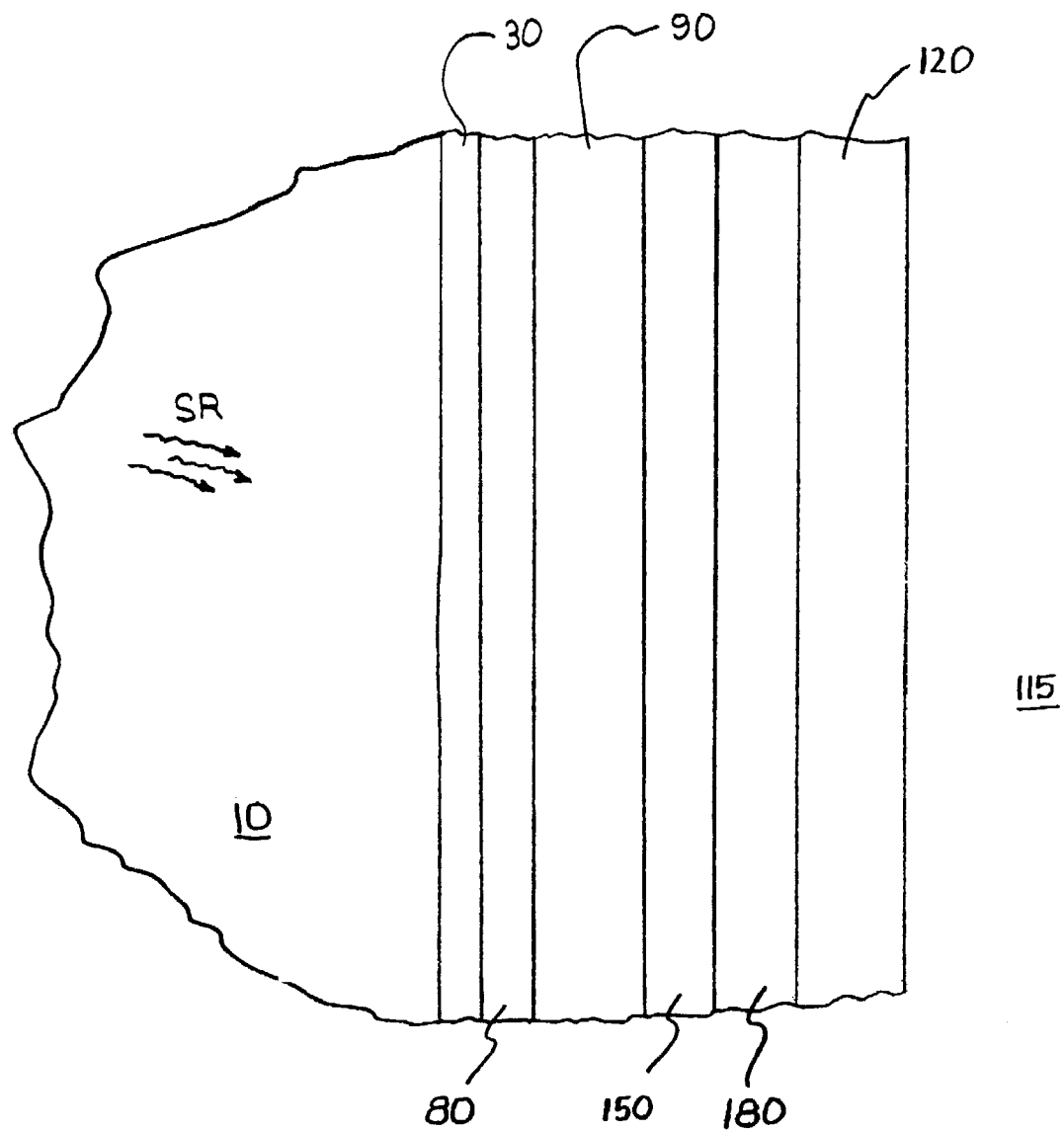

COATINGS HAVING LOW EMISSIVITY AND LOW SOLAR REFLECTANCE

CROSS-REFERENCE TO RELATED APPLICATIONS

This application claims priority to U.S. Patent Application No. 60/411,031 filed on Sep. 16, 2002, and U.S. Patent Application No. 60/376,826 filed on Apr. 29, 2002, the entire disclosure of each of which is hereby incorporated by reference.

FIELD OF THE INVENTION

The present invention provides coatings for glass and other substrates. More particularly, this invention provides low-emissivity coatings that have low solar reflectance. The invention also provides methods of producing coated substrates by depositing coatings of this nature, as well as insulating glass units and monolithic panes bearing these coatings.

BACKGROUND OF THE INVENTION

Windows can reflect a surprising amount of solar radiation. In some cases, this reflected radiation can become problematic. A certain amount of energy is, of course, carried in the solar radiation reflected off the exterior of a window. When this radiation falls on a nearby surface, the surface can be discolored. While this can occur even with a window having clear uncoated glass, the problem can be more significant when the window bears a coating that is highly reflective of solar radiation. This problem can also be more significant if the panes of the window in question have become inwardly cupped. (The panes of an IG unit can become cupped, for example, during cold weather when gas in the interior of the unit contracts.) The concave exterior pane of such a window would concentrate its reflected radiation at a focal point exterior to the window. This focal point would tend to move as the sun moves across the sky, thus potentially leaving elongated paths of discoloration.

As noted above, solar reflection problems can be particularly significant for windows and other glazings (e.g., doors, skylights, etc.) that bear reflective coatings, such as low-emissivity coatings. Low-emissivity coatings are well known in the present art. These coatings commonly include one or more reflective silver layers and two or more transparent dielectric layers. The silver layers in these coatings are highly reflective of infrared radiation. Thus, they favorably reduce the transmission of radiant heat through the coating. However, these coatings also tend to have relatively high solar reflectance. For example, a window bearing a conventional low-emissivity coating would typically have a solar reflectance of at least about 30%–35%, while the solar reflectance of a window having clear uncoated glass would typically be around 13%. Thus, from the perspective of solar reflection problems, conventional low-emissivity coatings are less than ideal. Accordingly, it would be desirable to provide a low-emissivity coating that has low solar reflectance.

It would be particularly desirable to provide a low-emissivity coating that has low solar reflectance and also provides significant shading properties. As is well known, the solar heat gain coefficient (SHGC) of a window is the fraction of incident solar radiation that is admitted through a window. There are a number of applications where low solar heat gain windows are of particular benefit. In warm climates, it is especially desirable to have low solar heat gain windows. For example, solar heat gain coefficients of about 0.4 and below are generally recommended for buildings in the southern United States. Similarly, any windows that are exposed to a lot of undesirable sun preferably have a low solar heat gain coefficient. For example, windows on the east or west side of a building tend to get a lot of sun in the morning and afternoon. Likewise, sunrooms, solariums, and greenhouses typically get a great deal of sun. For applications like these, the solar heat gain coefficient plays a vital role in maintaining a comfortable environment within the building in question. Thus, it is beneficial to provide windows of this nature with coatings that establish a low solar heat gain coefficient (i.e., high shading ability coatings).

A tradeoff is sometimes made in high shading ability coatings whereby the films selected to achieve a low SHGC have the effect of restricting the visible reflectance to a higher level than is desired. As a consequence, windows bearing these coatings may have a somewhat mirror-like appearance. It would be desirable to provide a high shading ability coating that has sufficiently low visible reflectance to obviate this mirror-like appearance problem.

In addition to having undesirably high visible reflectance, the transmitted and reflected colors of conventional high shading ability coatings tend not to be ideal. For example, these coatings commonly exhibit hues that are more red and/or yellow than is desired. To the extent a coating has a colored appearance, it is pleasing if the coating exhibits a transmitted and/or reflected hue that is blue or blue-green. The chroma of these coatings tends also to be greater than is desired. In most cases, it is preferable to provide a coating that is as color neutral (i.e., colorless) as possible. Thus, the reflected and transmitted colors of conventional low solar heat gain coatings tend to be less than ideal, both in terms of hue and chroma.

U.S. Patent Application No. 60/376,826 (Hoffman), the entire contents of which are incorporated herein by reference, discloses advantageous low-emissivity coatings that have low solar reflectance. These coatings achieve an exceptional combination of properties, including particularly low solar reflectance. In the '826 application, Hoffman describes five uniquely preferred low solar reflectance, low-emissivity film stacks. These film stacks are exceptionally well suited for a variety of applications. However, it would be desirable to improve these film stacks in such a way that they impart greater insulating ability in windows. For example, it would be desirable to achieve substantial decreases in emissivity and U Value. Unfortunately, the changes required to decrease emissivity and U Value would be expected to cause an attendant decrease in visible transmittance and/or an attendant worsening of reflected or transmitted color. As skilled artisans will appreciate, overcoming this problem is an exceedingly difficult task, particularly considering the presence of the high absorption primary layer in these coatings, which renders coating design highly unpredictable.

SUMMARY OF THE INVENTION

In certain embodiments, the present invention provides a pane bearing a low-emissivity coating. In these embodiments, the low-emissivity coating comprises an infrared-reflective layer, a high absorption primary layer, and a middle coat. The infrared-reflective layer comprises material that is highly reflective of infrared radiation. The infrared-reflective layer has a thickness of at least about 175 Å. The high absorption primary layer comprises material that is highly absorptive of solar radiation. The high absorption primary layer has a thickness of at least about 100 Å. The middle coat comprises at least one transparent dielectric film and is positioned between the infrared-reflective layer and the high absorption primary layer.

In certain embodiments, the invention provides a pane bearing a low-emissivity coating. In these embodiments, the low-emissivity coating comprises the following sequence of films (i.e., not necessarily in a contiguous sequence): an inner coat comprising at least one transparent dielectric film and having an optical thickness of between about 216 Å and about 312 Å; a high absorption primary layer comprising material that is highly absorptive of solar radiation and having a thickness of least about 100 Å; a middle coat comprising at least one transparent dielectric film and having an optical thickness of between about 600 Å and about 872 Å; an infrared-reflective layer comprising material that is highly reflective of infrared radiation and having a thickness of at least about 175 Å; a high absorption blocker layer comprising material that is highly absorptive of solar radiation and having a thickness of at least about 45 Å; and an outer coat comprising at least one transparent dielectric film and having an optical thickness of between about 410 Å and about 582 Å.

In certain embodiments, the invention provides a method of producing coated substrates. The method comprises providing a pane having generally-opposed first and second major surfaces. Upon one of the major surfaces, there is deposited a low-emissivity coating comprising an infrared-reflective layer, a high absorption primary layer, and a middle coat. The infrared-reflective layer comprises material that is highly reflective of infrared radiation. The infrared-reflective layer has a thickness of at least about 175 Å. The high absorption primary layer comprises material that is highly absorptive of solar radiation. The high absorption primary layer has a thickness of at least about 100 Å. The middle coat comprises at least one transparent dielectric film. The middle coat is positioned between the infrared-reflective layer and the high absorption primary layer. In some cases, the method comprises depositing the infrared-reflective layer as a silver-containing film. The method optionally comprises depositing the infrared-reflective layer at a thickness of between about 182 Å and about 274 Å. In some cases, the method comprises depositing the high absorption primary layer as a metallic film. The method optionally comprises depositing the high absorption primary layer as a titanium and/or niobium containing film. In some cases, the method comprises depositing the high absorption primary layer as a highly absorptive dielectric film. The method can optionally comprise depositing the high absorption primary layer at a thickness of between about 104 Å and about 151 Å. In some cases, the method comprises depositing the middle coat at an optical thickness of between about 600 Å and about 872 Å. In some such cases, the method comprises depositing each film of the middle coat as a film having a refractive index of between about 1.7 and about 2.4. In some cases, the method comprises depositing the infrared-reflective layer further from the substrate than the high absorption primary layer. In some such cases, the method further comprises depositing a high absorption blocker layer over the infrared-reflective layer, the high absorption blocker layer comprising material that is highly absorptive of solar radiation and having a thickness of at least about 45 Å. Optionally, the method can comprises depositing the high absorption blocker layer directly over the infrared-reflective layer. In some cases, the method comprises depositing the high absorption blocker layer as a metallic film. The method can optionally comprise depositing the high absorption blocker layer as a titanium and/or niobium containing film. The method can optionally comprise depositing the high absorption blocker layer at a thickness of between about 46 Å and about 78 Å. In some cases, the method further comprises depositing an inner coat between the substrate and the high absorption primary layer, the inner coat comprising at least one transparent dielectric film. The method can optionally comprise depositing the inner coat at an optical thickness of between about 216 Å and about 312 Å. For example, the method can comprise depositing each film of the inner coat as a film having a refractive index of between about 1.7 and about 2.4. In some cases, the method further comprises depositing an outer coat further from the substrate than the infrared-reflective layer, the outer coat comprising at least one transparent dielectric film. In some such cases, the method comprises depositing the outer coat at an optical thickness of between about 410 Å and about 582 Å. For example, the method can optionally comprise depositing each film of the outer coat as a film having a refractive index of between about 1.7 and about 2.4.

BRIEF DESCRIPTION OF THE DRAWINGS

FIG. 4 is a schematic cross-sectional side view of a glazing carrying a low solar reflectance coating in accordance with certain embodiments of the invention;

FIG. 4A is a detailed cross-sectional side view of region 4A of the low solar reflectance coating carried by the glazing of FIG. 4;

DETAILED DESCRIPTION OF PREFERRED EMBODIMENTS

Figure 1:
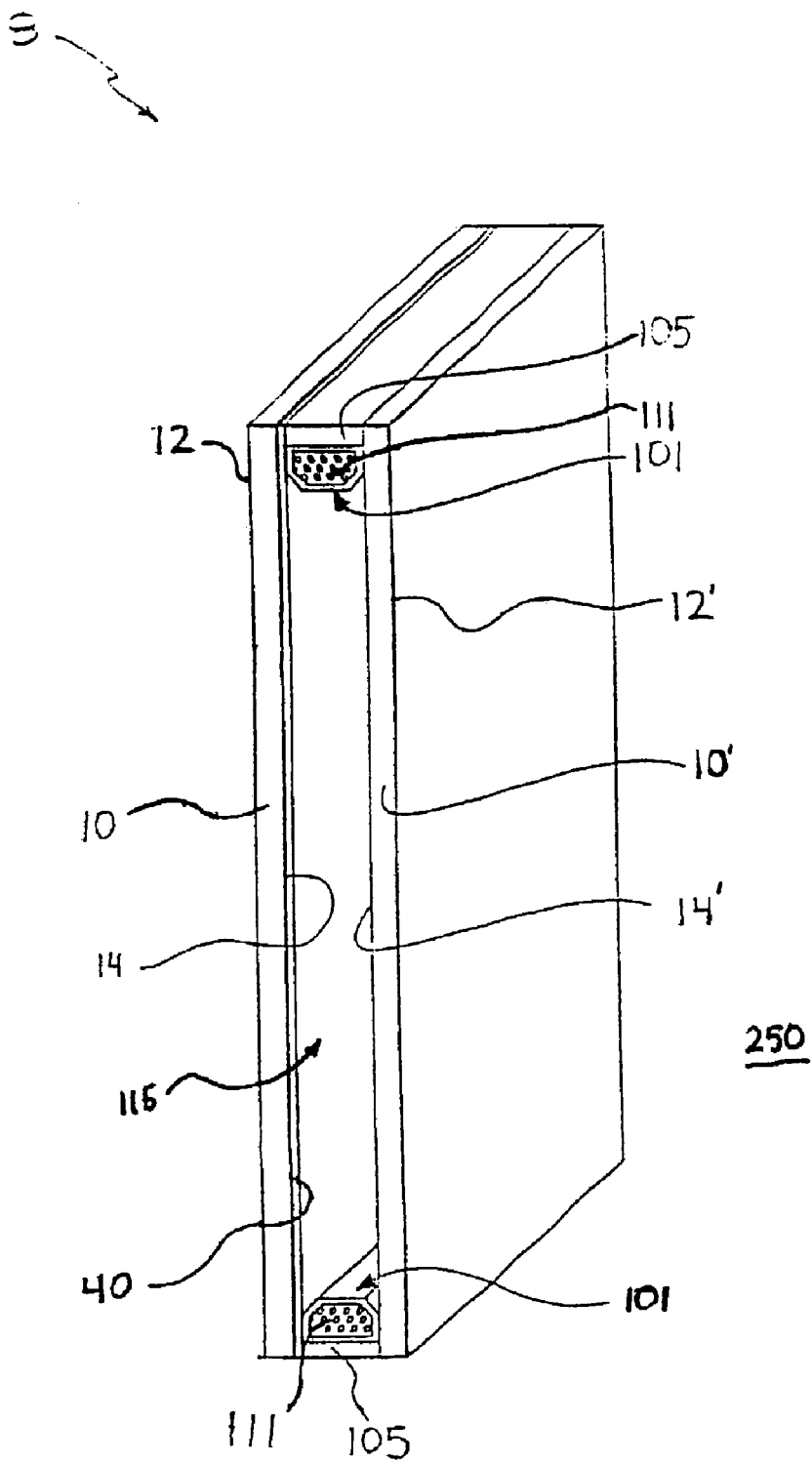
FIG. 1 is a cross-sectional perspective view of an insulating glass unit in accordance with certain embodiments of the present invention.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

A variety of substrates are suitable for use in the present invention. In most cases, the substrate 10 is a sheet of transparent material (i.e., a transparent sheet). However, the substrate 10 is not required to be transparent. For most applications, the substrate will comprise a transparent or translucent material, such as glass or clear plastic. In many cases, the substrate 10 will be a glass pane. A variety of known glass types can be used, and soda-lime glass is expected to be preferred.

Tinted glass can optionally be used in certain embodiments of the invention. Many suitable types of tinted glass are available from well known glass suppliers. Thus, a low solar reflectance coating of the invention can be applied to a pane of tinted glass, if so desired. In some cases, there is provided a multiple pane insulating glass unit (or "IG unit") wherein the low solar reflectance coating is applied to a pane of tinted glass, and this coated pane is incorporated (e.g., as an outboard pane) into an IG unit that also includes at least one pane (e.g., an inboard pane) of clear glass. While embodiments of this nature are contemplated, the present low solar reflectance coating 40 is particularly advantageous when used simply with clear glass.

In certain embodiments, the invention provides an IG unit that is provided with at least one low solar reflectance coating. IG units are well known in the present art. FIG. 1 depicts one example of an IG unit 8 that can be provided in accordance with the invention. The invention, however, is not limited to practice with any particular type of IG unit. To the contrary, all aspects of the invention can be practiced with IG units of any type (e.g., all-glass units, vacuum units, etc.). Thus, the illustrated IG unit type is not to be construed as limiting to the invention. Further, while the term insulating "glass" unit is used throughout the present disclosure, it is to be understood that the panes need not be formed of glass.

The IG unit 8 shown in FIG. 1 includes a first pane 10 and a second pane 10', together forming a pair of spaced-apart panes. The panes 10, 10' bound a between-pane space 115 therebetween and an exterior space 250 thereabout. The panes have confronting inner surfaces 14, 14' oriented toward the between-pane space 115 and opposed outer surfaces 12, 12' oriented away from the between-pane space 115. In the embodiment of FIG. 1, the panes 10, 10' are held in a spaced-apart configuration (e.g., in a substantially parallel spaced-apart relationship) by a spacer 101. The spacer 101 joins the peripheral inner surfaces of the panes. Thus, the spacer 101 and the confronting inner surfaces 14, 14' of the panes 10, 10' together define the between-pane space 115. Useful IG units, components thereof, and methods of manufacturing and using IG units are detailed in U.S. patent application Ser. No. 10/076,211, the entire teachings of which are incorporated herein by reference.

In the embodiment of FIG. 1, the illustrated IG unit 8 bears only one coating 40. However, other coatings can be provided on one or more of the other major surfaces 12, 12', 14' of the IG unit 8, if so desired. For example, it may be desirable to provide a variety of different coatings on one or both outer surfaces 12, 12' of the IG unit. In certain embodiments, a hydrophilic coating (not shown) is provided on one or both outer surfaces 12, 12'. In one embodiment, the #1 surface of an IG unit bears the hydrophilic coating, while the #2 surface bears the low solar reflectance coating 40. Useful hydrophilic coatings are disclosed in U.S. patent application Ser. Nos. 09/868,542, 09/572,766, and 09/599,301, the entire teachings of each of which are incorporated herein by reference. In another embodiment, the #1 surface bears the hydrophobic coating, while the #2 surface bears the low solar reflectance coating 40. Useful hydrophobic coatings are disclosed in U.S. Pat. No. 5,424,130 (Nakanishi et al), the entire teachings of which are incorporated herein by reference.

Further, certain embodiments provide an IG unit 8 wherein a photocatalytic coating (not shown) is provided on one or both outer surfaces 12, 12' of the IG unit 8. In one embodiment, the #1 surface bears the photocatalytic coating, and the #2 surface bears the low solar reflectance coating 40. Useful photocatalytic coatings are described in U.S. Pat. No. 5,874,701 (Watanabe et al), U.S. Pat. No. 5,853,866 (Watanabe et al), U.S. Pat. No. 5,961,843 (Hayakawa et al.), U.S. Pat. No. 6,139,803 (Watanabe et al), U.S. Pat. No. 6,191,062 (Hayakawa et al.), U.S. Pat. No. 5,939,194 (Hashimoto et al.), U.S. Pat. No. 6,013,372 (Hayakawa et al.), U.S. Pat. No. 6,090,489 (Hayakawa et al.), U.S. Pat. No. 6,210,779 (Watanabe et al), U.S. Pat. No. 6,165,256 (Hayakawa et al.), and U.S. Pat. No. 5,616,532 (Heller et al.), the entire teachings of each of which are incorporated herein by reference.

Figure 5:
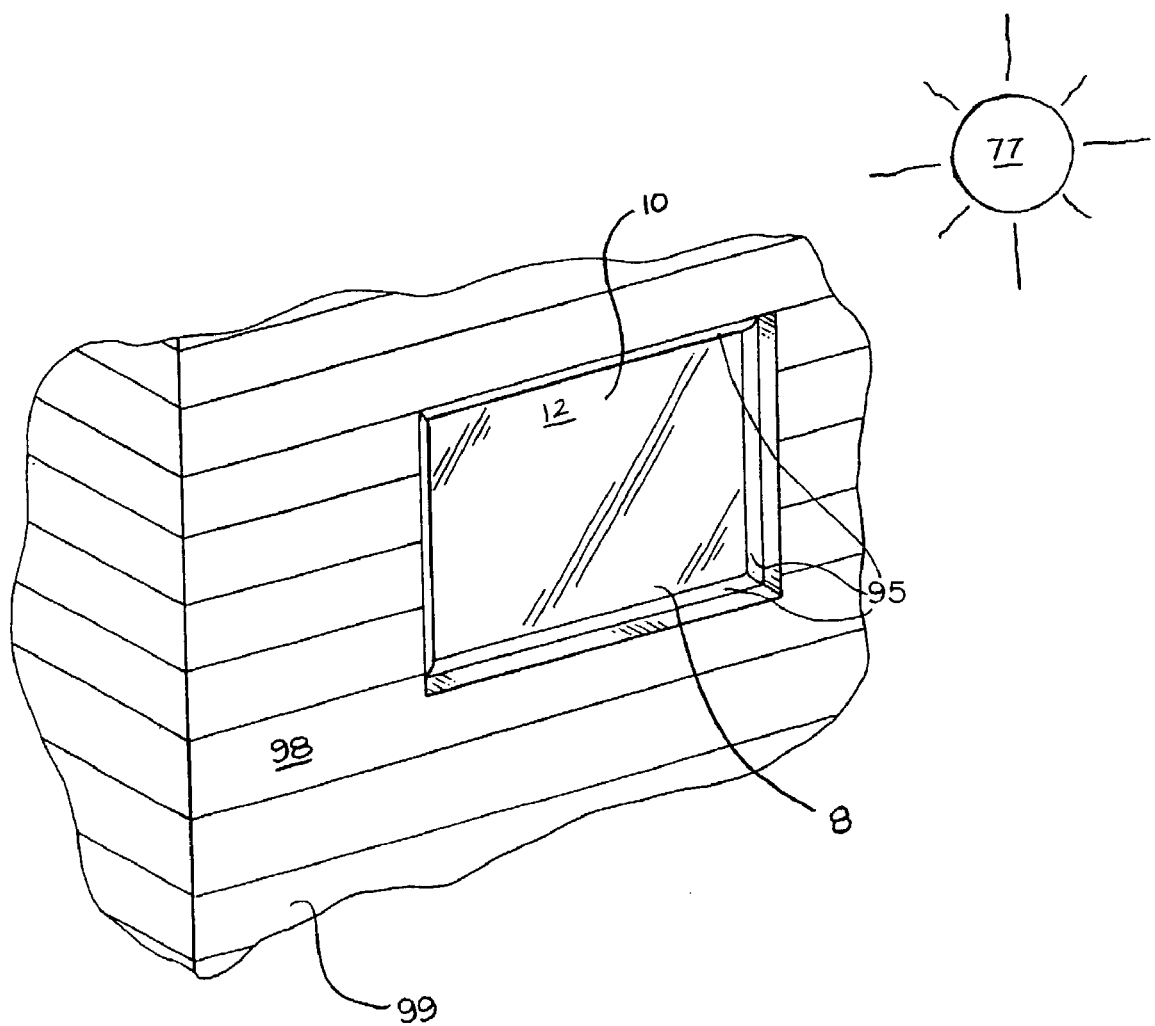
FIG. 5 is a perspective view of a glazing that carries a low solar reflectance coating and has been mounted in the outer wall of a building in accordance with certain embodiments the invention.

The improved low solar reflectance, low-emissivity coating 40 is preferably carried on the "second" surface of an IG unit. This is perhaps best appreciated with reference to FIGS. 4 and 5, wherein there is illustrated an IG unit 8 mounted upon a frame 90 in an exterior wall 98 of a building 99. In such embodiments, the "first" (or "#1") surface is that which faces (i.e., is exposed to, and communicates with) the outdoor environment. Accordingly, it is the #1 surface that radiation SR from the sun 77 first strikes. In FIGS. 4 and 5, the outer surface 12 of the first pane 10 is the so-called first surface. Moving from the #1 surface toward the interior side 33', the next surface is the "second" (or "#2") surface. As seen in FIG. 4, the inner surface 14 of the first pane 10 is the so-called second surface. Moving further toward the interior side 33', the next surface is the "third" (or "#3") surface, followed by the "fourth" (or "#4") surface. In FIG. 4, the inner surface 14' of the second pane 10' is the so-called third surface, and the outer surface 12' of the second pane 10' is the so-called fourth surface.

Thus, certain preferred embodiments of the invention provide an IG unit wherein an inner surface bears the low solar reflectance, low-emissivity coating 40. The coating 40 includes an infrared-reflective layer 150 and a high absorption primary layer 80. The high absorption primary layer 80 comprises titanium, niobium, or another material that is highly absorptive of solar radiation (e.g., a highly absorptive dielectric, such as titanium nitride). The high absorption primary layer 80 desirably has a thickness of at least about 100 Å, preferably between about 104 Å and about 151 Å, and more preferably between about 110 Å and about 144 Å. The infrared-reflective layer 150 comprises silver or another electrically-conductive material (e.g., metal), such as gold, copper, or the like. The infrared-reflective layer 150 desirably has a thickness of at least about 175 Å, particularly preferably between about 182 Å and about 274 Å, and more preferably between about 193 Å and about 262 Å. The high absorption primary layer 80 is preferably positioned further to the exterior 77' than the infrared-reflective layer 150, as is perhaps best appreciated with reference to FIGS. 4 and 4A. Preferably, the high absorption primary layer 80 is separated from the infrared-reflective layer by a middle coat 90 comprising at least one transparent dielectric film. Thus, certain embodiments provide a low solar reflectance, low-emissivity coating comprising: a high absorption primary layer (e.g., of the thickness and composition described in this paragraph); an infrared-reflective layer (e.g., of the thickness and composition described in this paragraph); and a middle coat 90 comprising at least transparent dielectric layer positioned between the high absorption primary layer and the infrared-reflective layer. In these embodiments, the coating 40 can optionally include inner 30 and outer 120 coats each comprising at least one transparent dielectric film.

In embodiments where the low solar reflectance coating 40 is carried on the #2 surface of the IG unit 8, the high absorption primary layer 80 is positioned closer to the pane 10 than the infrared-reflective layer 150. In some embodiments of this nature, the low solar reflectance coating 40 comprises, in sequence from the substrate 10 outwardly (i.e., not necessarily in a contiguous sequence): an inner coat 30 comprising at least one transparent dielectric film (preferably having a thickness of between about 108 Å and about 156 Å, more preferably between about 115 Å and about 150 Å, and perhaps optimally between about 128 Å and about 136 Å); a high absorption primary layer 80 (e.g., comprising titanium, niobium, titanium nitride, or another highly absorptive material, preferably having a thickness of at least about 100 Å, more preferably between about 104 Å and about 151 Å, and perhaps optimally between about 110 Å and about 144 Å); a middle coat 90 comprising at least one transparent dielectric film (preferably having a thickness of between about 300 Å and about 435 Å, more preferably between about 317 Å and about 416 Å, and perhaps optimally between about 353 Å and about 378 Å); an infrared-reflective layer 150 (e.g., formed of silver or another electrically-conductive material, preferably having a thickness of at least about 175 Å, more preferably between about 182 Å and about 274 Å, and perhaps optimally between about 193 Å and about 262 Å); a high absorption blocker layer 180 (e.g., comprising titanium, niobium, or another highly absorptive material, preferably having a thickness of at least about 45 Å, more preferably between about 46 Å and about 78 Å, and perhaps optimally between about 48 Å and about 75 Å); and an outer coat 120 comprising at least one transparent dielectric film (preferably having a thickness of between about 205 Å and about 291 Å, more preferably between about 217 Å and about 278 Å, and perhaps optimally between about 242 Å and about 253 Å).

The present low solar reflectance, low-emissivity coating 40 has a number of beneficial properties. The ensuing discussion reports several of these properties. In some cases, these properties are reported in the context of a single pane bearing the present coating on one surface. In other cases, these properties are reported in the context of an IG unit having the present coating 40 on its #2 surface. In such cases, the reported properties have been determined for an IG unit wherein both panes are 3 mm soda-lime float glass, and wherein the IG unit has a ½ inch *between-pane* space filled with an insulative gas mix of 90% argon and 10% air. Of course, these specifics are by no means limiting to the invention. Absent an express statement to the contrary, the present discussion reports determinations made using Window 4.1 under standard ASHRAE conditions.

An IG unit bearing a conventional double silver low-emissivity coating would typically have an exterior (i.e., off the glass side of the outboard pane) solar reflectance $R_s$ of at least about 30%–35%. Given the solar reflection problems discussed above, it would be desirable to provide a low-emissivity coating that offers lower solar reflection. The present IG unit 8 achieves an exterior solar reflectance $R_s$ of less than about 30%. In fact, the present IG unit 8 achieves an exterior solar reflectance $R_s$ of less than about 20%. While the precise level of solar reflection can be selected and varied in accordance with the teachings of this disclosure, certain preferred embodiments (e.g., where the coating 40 is one of the three uniquely preferred film stacks detailed below) provide an IG unit 8 having an exterior solar reflectance $R_s$ of about 16%.

The term "solar reflectance" is well known in the present art. This term is used herein in accordance with its well-known meaning to refer to the percentage of incident solar radiation SR that is reflected off the glass side of a monolithic pane (which bears the coating 40 on the opposite film side) or off the exterior of the present IG unit 8. Skilled artisans will appreciate that the solar reflectance off the glass side of the monolithic pane includes not only solar radiation reflected at the surface 12, but also solar radiation reflected at the surface 14. Likewise, the solar reflectance off the exterior side of the IG unit 8 (measured from the exterior 77 of the unit 8) includes not only solar radiation reflected at the surface 12, but also solar radiation reflected at surfaces 14, 14', and 12'. The reported solar reflectance is measured off a central portion of the glass side of the monolithic pane or off a central portion of the glass side of the outboard pane 10 of the present IG unit 8, is indicated as $R_s$ where s stands for solar. The solar reflectance can be determined as specified in "Standard Test Methods for Solar Energy Transmittance and Reflectance (Terrestrial) of Sheet Materials, ASTM", the entire contents of which are incorporated herein by reference.

Figure 6:
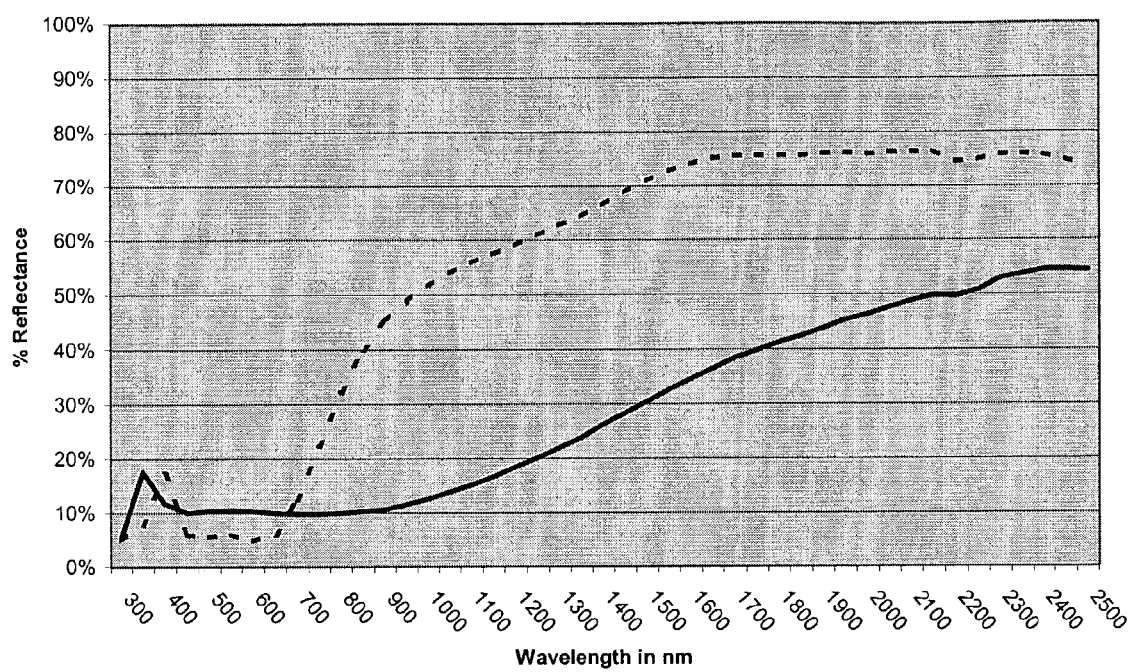
FIG. 6 is a graph of the glass-side solar reflectance of a monolithic pane carrying a low solar reflectance coating in accordance with certain embodiments of the invention.

FIG. 6 is a graph showing the glass-side reflectance of a monolithic pane bearing the present low solar reflectance coating (denoted by the solid line) relative to the glass-side reflectance of a monolithic pane bearing a double silver low-emissivity coating (denoted by the dashed line). The reflectance is reported in FIG. 6 for wavelengths between about 300 nm and about 2,500 nm. This wavelength range is of interest because the solar radiation that reaches the earth is primarily in this range. In FIG. 6, it can be appreciated that the total solar reflection of the present coating 40 is far less than that of the double-silver coating. Thus, the present coating 40 offers exceptionally low solar reflection.

In addition to low solar reflectance, the present coating 40 has exceptional shading ability. For example, the solar heat gain coefficient (SHGC) of the present IG unit 8 is particularly low. As is well known in the present art, the solar heat gain coefficient of a window is the fraction of incident solar radiation that is admitted through the window. The term "solar heat gain coefficient" is used herein in accordance with its well known meaning. Reference is made to NFRC 200-93 (1993), the entire teachings of which are incorporated herein by reference.

As noted above, there are many applications where low solar heat gain windows are of particular benefit. In warm climates, for example, it is desirable to have low solar heat gain windows. Further, any windows that are exposed to a lot of undesirable sun should have a low solar heat gain coefficient. For applications like these, the solar heat gain coefficient plays a vital role in maintaining a comfortable environment within a building. Thus, it is beneficial to provide windows of this nature with coatings that establish a low solar heat gain coefficient. For example, a solar heat gain coefficient of about 0.4 or less is commonly recommended for buildings in the southern United States and other warm climates.

The exceptional shading ability of the low solar reflectance coating 40 is particularly beneficial for warm climate applications. For example, the present IG unit 8 has a solar heat gain coefficient of less than about 0.4. In fact, the IG unit 8 has a solar heat gain coefficient of less than about 0.3, and preferably less than about 0.2. While the precise level of shading ability can be selected and varied in accordance with the teachings of this disclosure, certain preferred embodiments (e.g., where the coating 40 is one of the three uniquely preferred film stacks detailed below) provide an IG unit 8 having a solar heat gain coefficient of about 0.16. Thus, the low solar reflectance coating 40 is particularly beneficial when high shading ability is desired.

A limitation of some high shading ability coatings is that they reflect more visible light than is desired. As noted above, a tradeoff is sometimes made in high shading ability coatings whereby the films selected to achieve a low SHGC have the effect of restricting the visible reflectance to a level that is higher than ideal. As a consequence, windows bearing these coatings may have a somewhat mirror-like appearance.

To the contrary, the present coating 40 has sufficiently low visible reflectance to obviate this mirror-like appearance problem. For example, the exterior visible reflectance $R_v$ of the present IG unit 8 is less than about 20%. In fact, the IG unit 8 achieves an exterior visible reflectance $R_v$ of less than about 18%. While the precise level of visible reflectance can be selected and varied in accordance with the present teachings, certain preferred embodiments (e.g., where the coating 40 is one of the three uniquely preferred film stacks detailed below) achieve an IG unit 8 having an exterior visible reflectance $R_v$ of about 11%. In contrast, the exterior visible reflectance of an IG unit having panes of clear uncoated glass would typically be about 15%. The extraordinarily low visible reflectance of the coating 40 is exceptional considering the great thickness of the infrared-reflective layer. This evidences the surprising results that are achieved by the particular combination of films used in the present coating 40.

The term "visible reflectance" is well known in the present art. This term is used herein in accordance with its well-known meaning to refer to the percentage of all incident visible radiation that is reflected off the glass side of a monolithic pane (which bears the coating 40 on the opposite film side) or off the exterior of the present IG unit 8. Skilled artisans will appreciate that the visible reflectance off the glass side of a monolithic pane includes not only visible radiation reflected at the surface 12, but also visible radiation reflected at the surface 14. Likewise, the visible reflectance off the exterior side of the IG unit 8 (measured from the exterior 77 of the unit 8) includes not only visible radiation reflected at the surface 12, but also visible radiation reflected at surfaces 14, 14', and 12'. The reported visible reflectance is measured off a central portion of the glass side of the monolithic pane or off a central portion of the glass side of the outboard pane 10 of the present IG unit 8, and is indicated as $R_v$ where v stands for visible. Visible reflectance can be determined as specified in the above-noted "Standard Test Methods for Solar Energy Transmittance and Reflectance (Terrestrial) of Sheet Materials, ASTM".

Reference is made once again to FIG. 6, wherein there is illustrated the glass-side reflectance of a monolithic pane bearing the present coating 40 on one surface. Visible radiation comprises the wavelength range from about 380 nm to about 780 nm. As shown in FIG. 6, the glass-side reflectance of a pane bearing the present coating 40 is about 10% over a major portion (in fact, over substantially all) of the visible wavelength range. Further, the reflectance is well below 20% (and, in fact, does not exceed about 15%) over the entire visible range. Thus, it can be appreciated that the present coating 40 offers exceptionally low visible reflectance.

Figure 9:
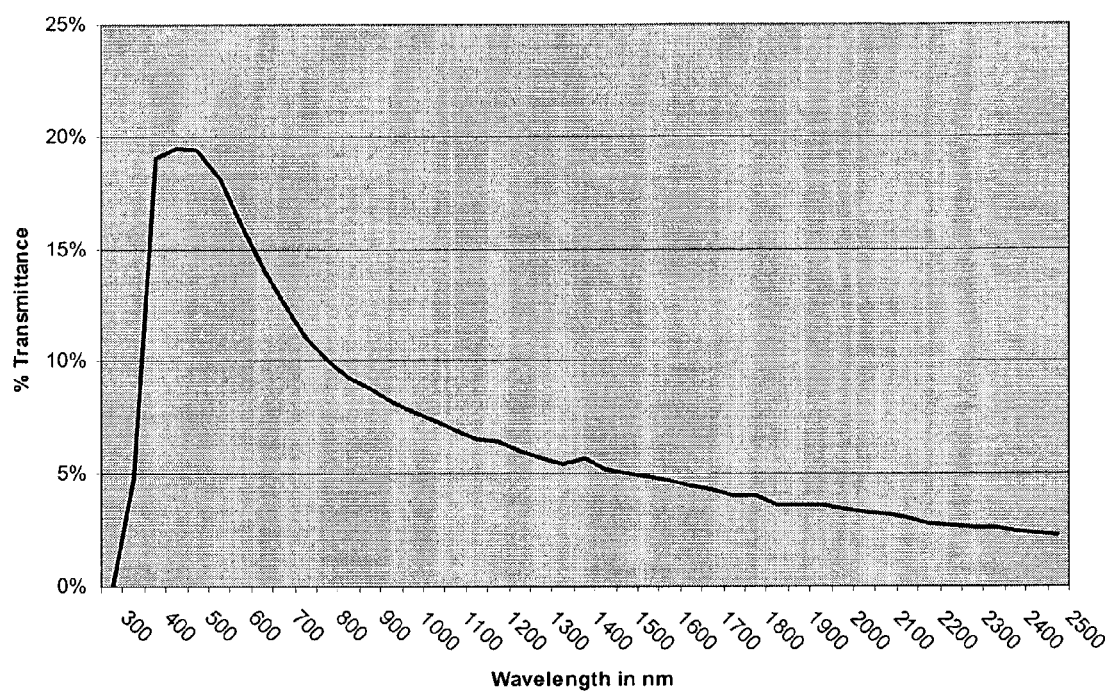
FIG. 9 is a graph of the solar transmittance of a monolithic pane carrying a low solar reflectance coating in accordance with certain embodiments of the invention.

FIG. 9 shows transmission properties of a monolithic pane bearing the present coating 40 on one surface. As can be appreciated, the transmittance of the pane is highest across the visible range of wavelengths. Peak transmittance occurs between the wavelengths of about 400 nm and 450 nm and is about 18%–19%. Transmittance decreases at wavelengths outside the visible range. As will be appreciated by skilled artisans, these transmission properties are highly desirable for a variety of applications, such as high shading applications.

In addition to these beneficial properties, the present coating 40 achieves color properties that are particularly pleasing. The following discussion of transmitted and reflected color is reported using the well known color coordinates of "a" and "b". In particular, these color coordinates are indicated herein using the subscript h (i.e., $a_h$ and $b_h$) to represent conventional use of the well known Hunter Lab Color System (Hunter methods/units, Ill. D65, 10 degree observer). The present color properties can be determined as specified in ASTM D-2244-93, "Standard Test Method For Calculation Of Color Differences From Instrumentally Measured Color Coordinates", Sep. 15, 1993, as augmented by ASTM E-308-85 Annual Book of ASTM Standards, Vol. 06.01 "Standard Method For Computing The Colors Of Objects By Using The CIE System", the entire contents of each of which are incorporated herein by reference.

Figure 7:
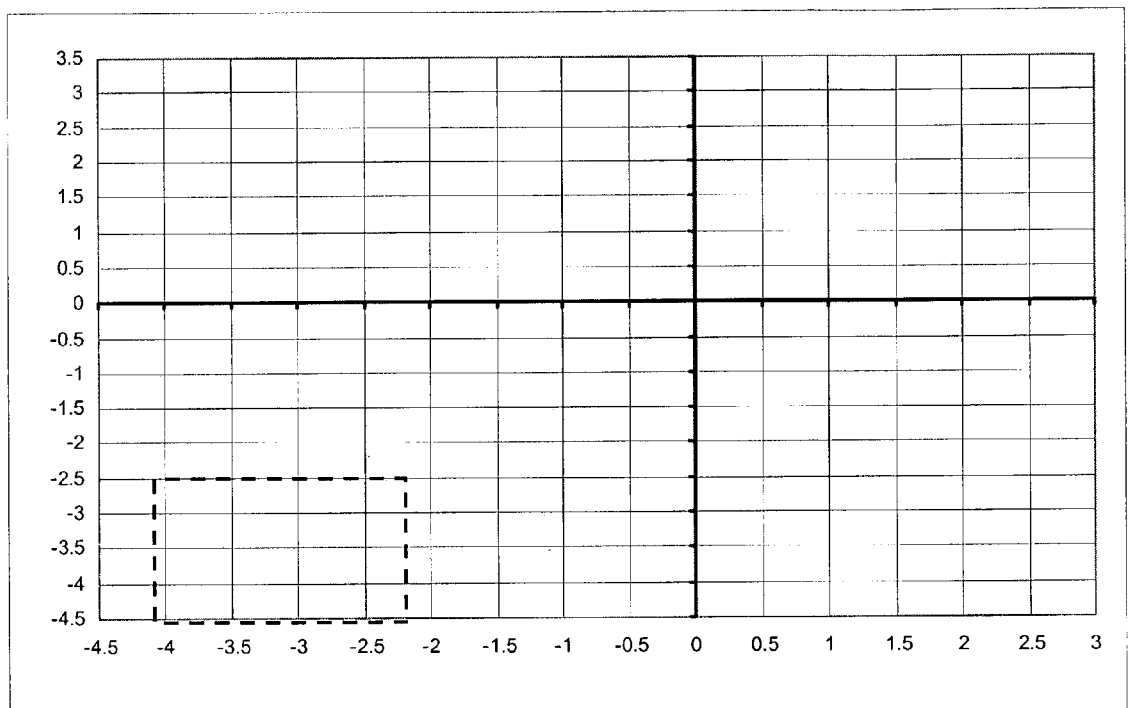
FIG. 7 is a graph of the transmitted color of an insulating glass unit carrying a low solar reflectance coating in accordance with certain embodiments of the invention.

The present IG unit 8 exhibits a transmitted color that is particularly pleasing. As noted above, it is commonly desirable for windows to exhibit hues of blue or blue-green. The transmitted hue of the present IG unit 8 falls entirely within the blue-green range. In particular, the IG unit 8 exhibits a transmitted color characterized by an $a_h$ color coordinate of between about −1.75 and about −4.5 and a $b_h$ color coordinate of between about −2 and about −5. In certain preferred embodiments (e.g., where the low solar reflectance coating 40 is one of the three uniquely preferred film stacks detailed below), the IG unit 8 exhibits a transmitted color characterized by an $a_h$ color coordinate of between about −2.1 and about −4.2 and a $b_h$ color coordinate of between about −2.5 and about −4.5. This can be appreciated with reference to FIG. 7, wherein the transmitted color of such an IG unit 8 is represented by the color box defined by the dashed lines. In this figure, it can be appreciated that the transmitted $a_h$ and $b_h$ color values are both negative, such that the transmitted hue is in the blue-green range. Further, the magnitude of the negative $a_h$ and $b_h$ values is very low, indicating very low chroma/very good color neutrality. Thus, when the present coating 40 is provided on an IG unit, the resulting unit 8 exhibits a particularly pleasing transmitted color. Accordingly, the present coating 40 is especially desirable for applications where transmitted color is of particular interest, such as in sunrooms, solariums, greenhouses, and the like.

Figure 8:
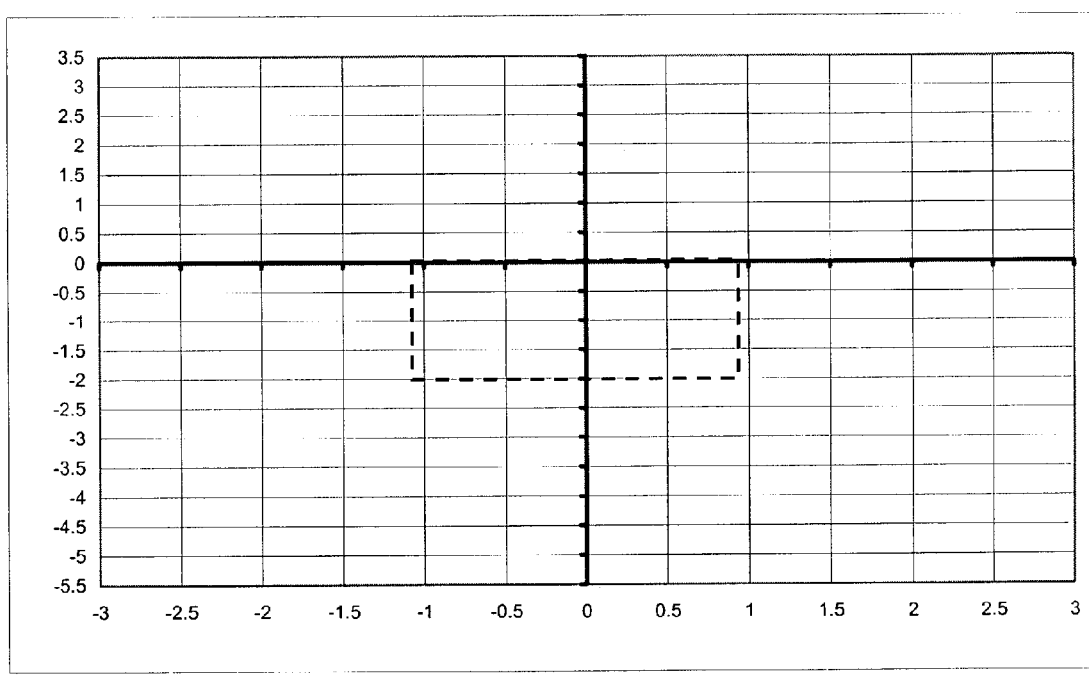
FIG. 8 is a graph of the exterior reflected color of an insulating glass unit carrying a low solar reflectance coating in accordance with certain embodiments of the invention.

The present IG unit 8 also exhibits a very pleasing color in reflection. The reflected color reported herein is measured from the exterior 77' of the IG unit 8. The present IG unit 8 is nearly colorless in reflection. In particular, the IG unit 8 exhibits a reflected color characterized by an $a_h$ color coordinate of between about 1.4 and about −1.6 and a $b_h$ color coordinate of between about 0.5 and about −2.5. In certain preferred embodiments (e.g., where the coating 40 is one of the three uniquely preferred film stacks detailed below), the IG unit 8 exhibits a reflected color characterized by an $a_h$ color coordinate of between about 0.9 and about −1.2 and a $b_h$ color coordinate of between about 0.0 and about −2. This is shown in FIG. 8, wherein the reflected color of such an IG unit 8 is represented by the color box defined by the dashed lines. In this figure, it can be appreciated that the chroma of the reflected color is exceptionally low, indicating that the coating 40 is nearly colorless.

In addition to the beneficial properties discussed above, the present IG unit 8 has exceptional thermal insulating properties. As noted above, the low solar reflectance coating 40 includes at least one infrared-reflective film 150. This film 150 is highly reflective of infrared radiation (i.e., radiant heat). Since the infrared-reflective film 150 is typically formed of silver or another electrically conductive material, this film 150 contributes low emissivity to the low solar reflectance coating 40. For example, the emissivity of the present coating 40 is less than about 0.07. In fact, the emissivity of this coating 40 is less than about 0.05. While the precise level of emissivity can be selected and varied in accordance with the present teachings, a number of preferred coating embodiments (e.g., the three uniquely preferred film stacks detailed below) provide an emissivity of about 0.044. In contrast, an uncoated pane of clear glass would typically have an emissivity of about 0.84. Thus, the present coating 40 achieves exceptionally low emissivity, and yet has excellent color properties and exceptionally low visible reflectance. This surprising combination of properties further evidences the extraordinary results that are achieved by the particular combination of films used in the present coating 40.

The term "emissivity" is well known in the present art. This term is used herein in accordance with its well-known meaning to refer to the ratio of radiation emitted by a surface to the radiation emitted by a blackbody at the same temperature. The present emissivity values can be determined as specified in "Standard Test Method For Emittance Of Specular Surfaces Using Spectrometric Measurements" NFRC 301-93, the entire contents of which are incorporated herein by reference.

The "U Value" of the present IG unit 8 is also exceptionally low. As is well known, the U Value of an IG unit is a measure of the thermal insulating ability of the unit. The smaller the U value the better the thermal insulating ability of the unit. The U Value of the present IG unit 8 is less than about 0.4. In fact, the IG unit 8 has U Value of less than about 0.3. While the precise level of U Value can be selected and varied in accordance with the present teachings, certain preferred embodiments (e.g., where the coating 40 is one of the three uniquely preferred film stacks detailed below) provide an IG unit 8 wherein the U Value is about 0.25. In comparison, the U Value of an IG unit having panes of uncoated glass would typically be about 0.46. Thus, the present coating 40 facilitates exceptionally low U Value.

The term U Value is well known in the present art. It is used herein in accordance with its well-known meaning to express the amount of heat that passes through one unit of area in one unit of time for each unit of temperature difference between a hot side of the IG unit 8 and a cold side of the IG unit 8. The U Value can be determined in accordance with the standard specified for $U_{winter}$ in NFRC 100-91 (1991), the entire contents of which are incorporated herein by reference.

Figure 2:
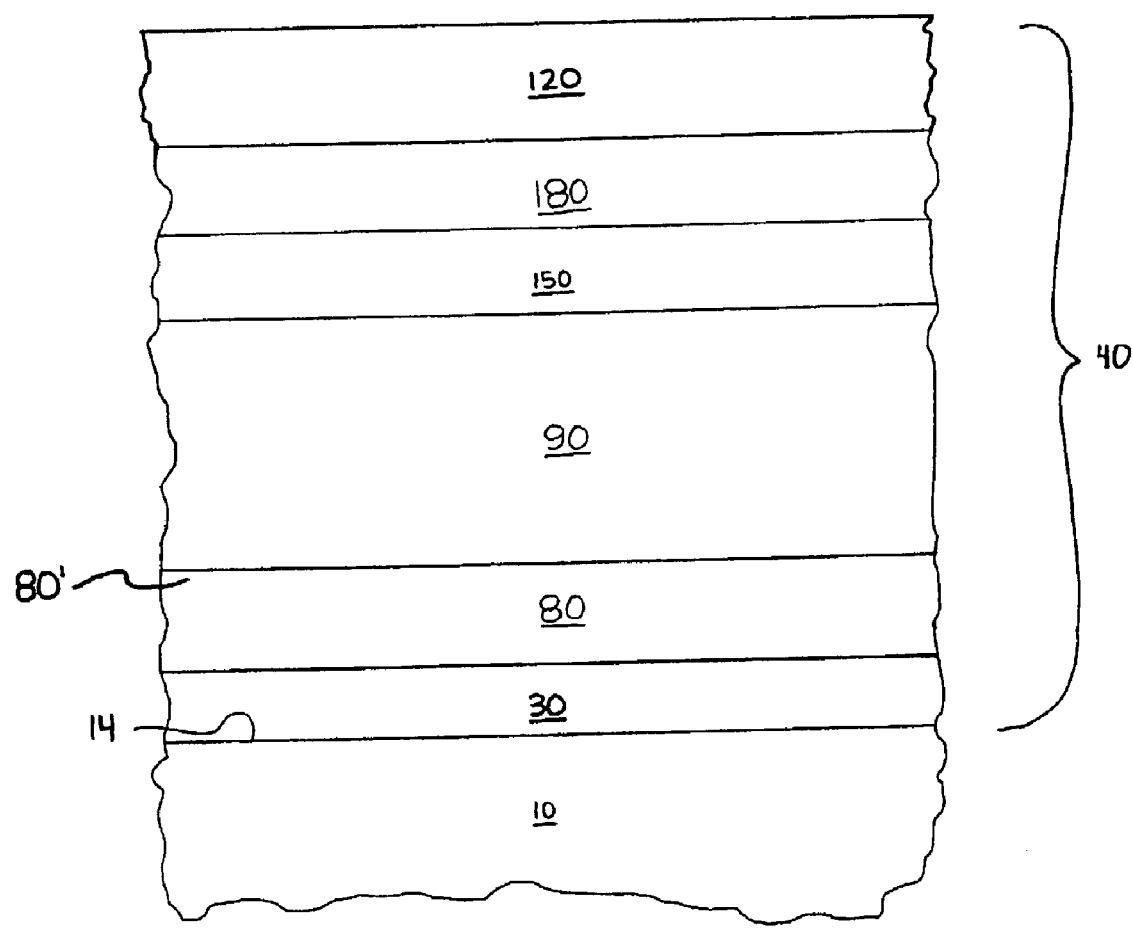
FIG. 2 is a schematic cross-sectional view of a low solar reflectance coating in accordance with certain embodiments the invention.

FIG. 2 depicts a preferred low solar reflectance coating 40 of the invention. As can be appreciated, the illustrated coating 40 generally includes the following sequence of films, moving outwardly (i.e., away from the substrate): a transparent dielectric inner coat 30; a high absorption primary layer 80; a transparent dielectric middle coat 90; an infrared-reflective layer 150; a high absorption blocker layer 180; and a transparent dielectric outer coat 120. The present disclosure teaches particular combinations of thicknesses and materials for these films, which combinations achieve the exceptional properties described above.

As noted above, the present coating 40 includes an infrared-reflective film 150. This infrared-reflective film 150 is preferably formed of an electrically-conductive material (e.g., metal), such as silver, gold, copper, or the like. Alloys or mixtures of these metals can also be used. In most cases, it will be preferable to employ a silver or silver-containing film (e.g., comprising a major weight percentage of silver). The term "silver-containing" is used herein to refer to any film that includes at least some silver. For example, one may provide an infrared-reflective film in the form of silver combined with a small amount of gold (e.g., about 5% gold or less).

The infrared-reflective film 150 is highly reflective of infrared radiation. As a result, this film 150 substantially reduces the transmission of radiant heat through the coating 40. Further, the electrically-conductive material of this film 150 has low sheet resistance, and hence low emissivity. Thus, the infrared-reflective film 150 contributes low emissivity to the coating 40. As noted above, these properties are desirable for coatings on windows and other glazings (e.g., doors, skylights, etc.). For example, during a cold winter it is desirable to minimize the heat that escapes from a warm room through a window to a cold outdoor environment. Likewise, during a warm summer it is desirable to minimize the heat that enters a cool room through a window from a hot outdoor environment. Thus, the infrared-reflective film 150 is advantageous in that it helps reduce the amount of heat that passes through the coating 40.

The infrared-reflective film 150 is preferably provided at particular thicknesses. The thickness of this film 150 is desirably at least about 175 Å, preferably between about 182 Å and about 274 Å, more preferably between about 193 Å and about 262 Å, and perhaps optimally between about 215 Å and about 238 Å. Forming the infrared-reflective layer 150, especially of silver or a silver-containing film, at these thicknesses is particularly preferred.

The low solar reflectance coating 40 preferably includes a high absorption primary layer 80. The high absorption primary layer 80 is preferably formed of particular materials. For example, this primary layer 80 preferably comprises titanium, niobium, or another material that is highly absorptive of solar radiation (e.g., a highly absorptive dielectric material, such as titanium nitride). The high absorption primary layer 80 absorbs a substantial portion of incident solar radiation. In certain preferred embodiments, the primary layer 80 comprises metallic titanium, metallic niobium, or another metallic material that is highly absorptive of solar radiation. Thus, the layer 80 may consist, or consist essentially, of a highly absorptive metallic material. In some cases, all but a portion of the high absorption primary layer 80 is metallic. In such cases, the outer portion (i.e., the portion furthest from the substrate) of this layer 80 may be oxidized, nitrided, or otherwise reacted to some extent. This tends to occur when the high absorption primary layer 80 is deposited as metallic film, and the deposition of a subsequent film is performed in a reactive (e.g., oxidizing and/or nitriding) atmosphere. In such cases, the outer face of the primary layer 80 is exposed to the reactive atmosphere during an initial period of the subsequent film deposition, such that the outer portion 80' of the primary layer 80 is oxidized, nitrided, and/or otherwise reacted. In these embodiments, it is desirable if no more than a minor portion (e.g., less than 50% of the thickness) of the primary layer 80 is a reaction product (e.g., an oxide, nitride, and/or oxynitrides), and a major portion (e.g., 50% or more of the thickness) thereof is metallic. Thus, it can be appreciated that certain embodiments involve a high absorption primary layer 80 that consists, or consists essentially, of a highly absorptive metallic material and reaction products of such metallic material.

The high absorption primary layer 80 is preferably provided at particular thicknesses. The thickness of the high absorption primary layer 80 is desirably at least about 100 Å, preferably between about 104 Å and about 151 Å, more preferable between about 110 Å and about 144 Å, and perhaps optimally between about 123 Å and about 131 Å. Forming the high absorption primary layer 80 at these thicknesses is particularly preferred, especially when this layer 80 is formed of particular materials, as will now be described.

In certain particularly preferred embodiments, the high absorption primary layer 80 comprises titanium. In one embodiment, this layer 80 is a titanium-containing film having a thickness within at least one of the ranges described in the preceding paragraph. The term "titanium-containing" is used herein to refer to any film that contains at least some titanium. Thus, absent an express statement to the contrary, materials other than titanium may be present in such a film. In some cases, the high absorption primary layer 80 is a titanium-containing film that consists, or consists essentially, of titanium. In other cases, this layer 80 is a titanium-containing film having an outer portion 80' that is a reaction product of titanium (e.g., titanium oxide, titanium nitride, and/or titanium oxynitride). In such cases, it will generally be preferred if a major inner portion (i.e., 50% or more) of the titanium-containing film is metallic titanium, while a minor outer portion (i.e., less than 50%) is a titanium reaction product. For example, the high absorption primary layer 80 can be a titanium-containing film wherein metallic titanium accounts for at least about 62 Å, more preferably at least about 75 Å, and perhaps optimally at least about 80 Å of this layer 80 (e.g., where at least the innermost 62 Å, 75 Å, or 80 Å is metallic titanium). In certain embodiments, the high absorption primary layer is deposited as a metallic titanium film.

In certain embodiments, the high absorption primary layer 80 comprises niobium. In one embodiment, this layer 80 is a niobium-containing film having a thickness within at least one of the described ranges. The term "niobium-containing" is used herein to refer to any film that contains at least some niobium. Absent an express statement to the contrary, materials other than niobium may be present in such a film. In some cases, the high absorption primary layer 80 is a niobium-containing film that consists, or consists essentially, of niobium. In other cases, this layer 80 is a niobium-containing film having an outer portion 80' that is a reaction product of niobium (e.g., niobium oxide, niobium nitride, and/or niobium oxynitride). In such cases, it will generally be preferred if a major inner portion of the niobium-containing film is metallic niobium, while a minor outer portion is a niobium reaction product. For example, the high absorption primary layer 80 can be a niobium-containing film wherein metallic niobium accounts for at least about 62 Å, more preferably at least about 75 Å, and perhaps optimally at least about 80 Å of this layer 80 (e.g., where at least the innermost 62 Å, 75 Å, or 80 Å is metallic niobium). In certain embodiments, the high absorption primary layer is deposited as a metallic niobium film.

In certain embodiments, the high absorption primary layer 80 comprises both niobium and titanium. In one embodiment, this layer 80 is a niobium-titanium-containing film having a thickness within at least one of the described ranges. The term "niobium-titanium-containing" is used herein to refer to any film that contains at least some niobium and at least some titanium. Absent an express statement to the contrary, materials other than niobium and titanium may be present in such a film. Useful niobium-titanium films and methods for their deposition are described in U.S. patent application Ser. No. 10/123,032, filed on Apr. 11, 2002 and entitled "Thin Film Coating Having Niobium-Titanium Layer", the entire contents of which are incorporated herein by reference. In some cases, the high absorption primary layer 80 is a niobium-titanium-containing film that consists, or consists essentially, of niobium and titanium. In other cases, this layer 80 is a niobium-titanium-containing film having an outer portion 80' that is a reaction product of a niobium-titanium material. In such cases, it will generally be preferred if a major inner portion of this niobium-titanium-containing film is metallic niobium-titanium (e.g., an alloy of niobium and titanium), while a minor outer portion is a niobium-titanium reaction product. For example, the high absorption primary layer 80 can be a niobium-titanium-containing film wherein metallic niobium-titanium accounts for at least about 62 Å, more preferably at least about 75 Å, and perhaps optimally at least about 80 Å of this layer 80 (e.g., where at least the innermost 62 Å, 75 Å or 80 Å is metallic niobium-titanium). In certain embodiments, the high absorption primary layer is deposited as a metallic niobium-titanium film.

In certain embodiments, the high absorption primary layer 80 comprises a dielectric film that is highly absorptive of solar radiation. In one such embodiment, the high absorption primary layer 80 comprises (e.g., consists essentially of) titanium nitride. Of course, skilled artisans may wish to select other known high absorption dielectric films.

With continued reference to the preferred embodiment of FIG. 2, it can be appreciated that the coating 40 preferably includes a high absorption blocker layer 180. This blocker layer 180 is preferably deposited directly over the infrared-reflective film 150. The preferred high absorption blocker layer 180 serves a number of purposes. For example, this layer 180 protects the underlying infrared-reflective film 150 during the deposition of subsequent films. This blocker layer 180 preferably comprises a metal or metal alloy that reacts readily with oxygen, nitrogen, or other reactive gas used in depositing subsequent films. This allows the blocker layer 180 to capture reactive gas that would otherwise reach and react with the infrared-reflective film 150. In addition, the high absorption blocker layer 180 provides the infrared-reflective film 150 with exceptional protection against chemical corrosion. This is believed to be a result of the relatively great thickness of the high absorption blocker layer 180, as compared to conventional blocker layers. The protective properties of the high absorption blocker layer 180 are credited in part for the outstanding chemical durability that has been observed in the present coating 40. Further, the high absorption blocker layer 180 affords exceptional control over the transmitted color of the present coating 40. As described above, the transmitted color of the present coating 40 is exceptionally color neutral, and this is attributed in part to the particular composition and thickness of the high absorption blocker layer 180.

The high absorption blocker layer 180 is preferably provided at particular thicknesses. The thickness of this layer 180 is desirably at least about 45 Å, preferably between about 46 Å and about 78 Å, more preferably between about 48 Å and about 75 Å, and perhaps optimally between about 54 Å and about 68 Å. Forming the high absorption blocker layer 180 at these thicknesses is particularly preferred, especially when this layer 180 is formed of particular materials, as will now be described.

In a number of particularly preferred embodiments, the high absorption blocker layer 180 comprises titanium. In certain embodiments, this layer 180 is a titanium-containing film having a thickness within at least one of the ranges described in the preceding paragraph. The high absorption blocker layer 180 can be a titanium-containing film that consists, or consists essentially, of titanium. Alternatively, this layer 180 can be a titanium-containing film having an outer portion that is a reaction product of titanium (e.g., titanium oxide, titanium nitride, and/or titanium oxynitride). In such cases, it will generally be preferred if a major inner portion of the titanium-containing film is metallic titanium, while a minor outer portion is a titanium reaction product. Thus, the high absorption blocker layer 180 can be a titanium-containing film wherein metallic titanium accounts for at least about 23 Å, more preferably at least about 25 Å, and perhaps optimally at least about 27 Å of this layer 180 (e.g., where at least the innermost 23 Å, 25 Å, or 27 Å is metallic titanium).

In certain embodiments, the high absorption blocker layer 180 comprises niobium. In some embodiments of this nature, the high absorption blocker layer 180 is a niobium-containing film having a thickness within at least one of the described ranges. The high absorption blocker layer 180 can be a niobium-containing film that consists, or consists essentially, of niobium. Alternatively, this layer 180 can be a niobium-containing film having an outer portion that is a niobium reaction product. In such cases, it will generally be preferred if a major inner portion of the niobium-containing film is metallic niobium, while a minor outer portion is a niobium reaction product. For example, the high absorption blocker layer 180 can be a niobium-containing film wherein metallic niobium accounts for at least about 23 Å, more preferably at least about 25 Å, and perhaps optimally at least about 27 Å of this layer 180 (e.g., where at least the innermost 23 Å, 25 Å, or 27 Å is metallic niobium).

In certain embodiments, the high absorption blocker layer 180 comprises both niobium and titanium. Useful niobium-titanium blocker layers are described in the above-noted '032 patent application. In some embodiments of this nature, the high absorption blocker layer 180 is a niobium-titanium-containing film having a thickness within at least one of the noted ranges. The high absorption blocker layer 180 can be a niobium-titanium-containing film that consists, or consists essentially, of a niobium-titanium material (e.g., alloys of niobium and titanium). Alternatively, the high absorption blocker layer 180 can be a niobium-titanium-containing film having an outer portion that is a reaction product of niobium-titanium. In such cases, it will generally be preferred if a major inner portion of the niobium-titanium-containing film is metallic niobium-titanium, while a minor outer portion is present in the form of a niobium-titanium reaction product. For example, the high absorption blocker layer 180 can be a niobium-titanium-containing film wherein metallic niobium-titanium accounts for at least about 23 Å, more preferably at least about 25 Å, and perhaps optimally at least about 27 Å of this layer 180 (e.g., where at least the innermost 23 Å, 25 Å, or 27 Å is metallic niobium-titanium).

The low solar reflectance coating 40 is preferably provided with a transparent dielectric inner coat 30, a transparent dielectric middle coat 90, and a transparent dielectric outer coat 120. The transparent dielectric films 30, 90, 120 are preferred to establish the exceptionally well-balanced properties of the present coating 40. For example, these preferred films reduce the visible reflectance of the coating 40, control the color of the coating 40, and impart chemical durability in the coating 40. The preferred inner coat 30 is positioned between the substrate 10 and the high absorption primary layer 80, while the preferred outer coat 120 is positioned further from the substrate 10 than the infrared-reflective film 150. In some cases, the preferred inner coat 30 is contiguous to the substrate 10. However, the invention also provides embodiments wherein a transparent base layer 20 (not shown) is positioned between the preferred inner coat 30 and the substrate 10. Useful transparent base layers 20 are described in U.S. patent application Ser. No. 10/087,662, the entire contents of which are incorporated herein by reference. In certain embodiments, the preferred outer coat 120 forms the outermost film region of the present coating 40. Alternatively, a variety of overcoats can be positioned further from the substrate than the preferred outer coat, if so desired.

The preferred inner 30 and outer 120 coats each comprise at least one transparent dielectric film. The term "transparent dielectric" is used herein to refer to any non-metallic (i.e., neither a pure metal nor a metal alloy) compound that includes any one or more metals and is substantially transparent when deposited as a thin film. For example, included in this definition would be any metal oxide, metal nitride, metal carbide, metal sulfide, metal boride, and any combination thereof (e.g., an oxynitride). Further, the term "metal" should be understood to include all metals and semi-metals (i.e., metalloids). In particular, useful metal oxides include oxides of zinc, tin, indium, bismuth, titanium, hafnium, zirconium, and alloys and mixtures thereof. While metal oxides are advantageous due to their ease and low cost of application, known metal nitrides (e.g., silicon nitride, titanium nitride, etc.) can also be used advantageously. Skilled artisans will be familiar with other useful transparent dielectric materials.

The preferred inner coat 30 is preferably provided at particular thicknesses. For example, the physical thickness of the inner coat 30 is preferably between about 108 Å and about 156 Å, more preferably between about 115 Å and about 150 Å, and perhaps optimally between about 128 Å and about 136 Å. In a first embodiment, the inner coat 30 is a single zinc oxide film. In a second embodiment, the inner coat 30 is a single titanium oxide film (e.g., titanium dioxide and/or substoichiometric $TiO_x$, where x is less than 2). In a third embodiment, the inner coat 30 is a single silicon nitride film. In a fourth embodiment, the inner coat 30 is a single tin oxide film. In each of these four embodiments, the thickness of the inner coat 30 is preferably within at least one of the ranges described in this paragraph.

In certain alternate embodiments (not shown), the inner coat 30 comprises at least two films. The preferred inner coat 30 can be formed of essentially any desired number of films. However, the total optical thickness of the inner coat 30 (whether it consists of one or multiple films) is preferably between about 216 Å and about 312 Å, more preferably between about 230 Å and about 300 Å, and perhaps optimally between about 256 Å and about 272 Å. In certain embodiments, each film of the inner coat 30 is a transparent dielectric film having a refractive index of between about 1.7 and about 2.4, and perhaps optimally about 2.0.

The exceptional properties of the present coating 40 are due in part to the thinness of the preferred inner coat 30. Excellent antireflection and color is achieved by providing the preferred inner coat 30 at an optical thickness of less than about 312 Å, more preferably less than about 300 Å, and perhaps optimally less than about 272 Å, while desirably having an optical thickness of at least about 216 Å.

The preferred outer coat 120 is also preferably provided at particular thicknesses. For example, the physical thickness of the outer coat 120 is preferably between about 205 Å and about 291 Å, more preferably between about 217 Å and about 278 Å, and perhaps optimally between about 242 Å and about 253 Å. In a first embodiment, the outer coat 120 is a single zinc oxide film. In a second embodiment, the outer coat 120 is a single titanium oxide film. In a third embodiment, the outer coat 120 is a single silicon nitride film. In a fourth embodiment, the outer coat 120 is a single tin oxide film. In each of these four embodiments, the thickness of the outer coat 120 preferably is within at least one of the ranges described in this paragraph.

In a number of preferred embodiments (not shown), the outer coat 120 comprises at least two films. As with the inner coat 30, the preferred outer coat 120 can be formed of essentially any desired number of films. However, the total optical thickness of the outer coat 120 (whether it consists of one or multiple films) is preferably between about 410 Å and about 582 Å, more preferably between about 434 Å and about 556 Å, and perhaps optimally between about 484 Å and about 506 Å. In certain embodiments, each film of the outer coat 120 is a transparent dielectric film having a refractive index of between about 1.7 and about 2.4, and perhaps optimally about 2.0.

In certain preferred embodiments, the outer coat 120 comprises two outer films of different transparent dielectric materials. These films can be formed respectively of essentially any two transparent dielectric materials. In some cases, these films are contiguous to one another, although this is not required. In one embodiment, the outer coat 120 comprises a first layer of zinc oxide and a second layer of silicon nitride positioned over (e.g., directly over) the zinc oxide layer. Alternatively, the first layer can be titanium oxide and the second layer can be silicon nitride. As still another alternative, the first layer can be tin oxide and the second layer can be silicon nitride. As yet another alternative, the first layer can be zinc oxide and the second layer can be titanium oxide or tin oxide. The respective thicknesses of these outer films can be selected and varied as desired. Preferably, the combined optical thickness of these two films is within at least one of the ranges described in the preceding paragraph.

In embodiments where the outer coat 120 comprises multiple films, the outermost of these films preferably comprises a chemically-durable material, such as silicon nitride. U.S. Pat. No. 5,834,103, the entire contents of which are incorporated herein by reference, describes silicon nitride films that can be used advantageously as the outermost film in the present coating 40. In certain particularly preferred embodiments, the outermost film is silicon nitride deposited at a thickness of between about 15 Å and about 46 Å, more preferably between about 16 Å and about 44 Å, and perhaps optimally between about 18 Å and about 40 Å.

A chemically-durable film of the nature (e.g., of the thickness and composition) just described can be deposited advantageously over (i.e., further from the substrate than) an underlying, outer transparent dielectric film having a thickness of between about 177 Å and about 270 Å, more preferably of between about 189 Å and about 259 Å, and perhaps optimally between about 209 Å and about 235 Å. In certain embodiments, this underlying (e.g., directly underlying) transparent dielectric film is formed of zinc oxide, titanium oxide, or tin oxide. In particular, the high sputtering rate of zinc oxide makes it a preferred material for this underlying, outer transparent dielectric film.

The exceptional optical properties of the present coating 40 are due in part to the thinness of the preferred outer coat 120. Excellent antireflection and color is achieved by providing the preferred outer coat 120 at an optical thickness of less than about 582 angstroms, more preferably less than about 556 angstroms, and perhaps optimally less than about 506 angstroms, while desirably having an optical thickness of at least about 410 angstroms.

The low solar reflectance coating 40 is preferably provided with a transparent dielectric middle coat 90 between the high absorption primary layer 80 and the infrared-reflective layer 150. The preferred middle coat 90 comprises at least one transparent dielectric film. In certain preferred embodiments, the middle coat 90 is provided in the form of a single transparent dielectric film. This film can comprise any of the transparent dielectric materials described above. In one embodiment, the middle coat 90 is a single zinc oxide film.

The transparent dielectric middle coat 90 is preferably provided at particular thicknesses. For example, the physical thickness of the middle coat 90 is preferably between about 300 Å and about 435 Å, more preferably between about 317 Å and about 416 Å, and perhaps optimally between about 353 Å and about 378 Å. Forming the transparent dielectric middle coat 90 at these thicknesses is particular preferred. The thicknesses noted herein are physical thicknesses, unless specifically identified as being optical thicknesses.

In alternate embodiments (not shown), the middle coat 90 is provided in the form of a plurality of transparent dielectric films. Whether the middle coat 90 consists of one or multiple films, the overall optical thickness of this coat 90 is preferably between about 600 Å and about 872 Å, more preferably between about 636 Å and about 832 Å, and perhaps optimally between about 706 Å and about 756 Å. In certain embodiments, each film in the middle coat 90 is a transparent dielectric film having a refractive index of between about 1.7 and about 2.4, and perhaps optimally about 2.0.

The exceptional optical properties of the present coating 40 are due in part to the relative optical thicknesses of the preferred inner coat 30, the preferred middle coat 90, and the preferred outer coat 120. For example, in certain embodiments, there is provided a specific ratio of the optical thickness of the inner coat 30 relative to the optical thickness of the middle coat 90. Additionally or alternatively, there can be provided a specific ratio of the optical thickness of the outer coat 120 relative to the optical thickness of the middle coat 90.

In certain embodiments, the ratio of optical thickness of the inner coat 30 to the optical thickness of the middle coat 90 is preferably between about 0.28 and about 0.47, more preferably between about 0.34 and about 0.39, and perhaps optimally about 0.35–0.36. Further, in certain embodiments, the ratio of the optical thickness of the outer coat 120 to the optical thickness of the middle coat 90 is preferably between about 0.52 and about 0.88, more preferably between about 0.64 and about 0.72, and perhaps optimally about 0.67–0.69. In certain preferred embodiments, the coating 40 has one of the foregoing ratios of inner coat/middle coat as well as one of the foregoing ratios of outer coat/middle coat.

Three uniquely preferred low solar reflectance film stack 40 embodiments will now be detailed. Each of these film stacks is preferably utilized as a second-surface coating. In particular, where one of these film stacks is born on the #2 surface of an IG unit, the resulting unit 8 achieves all of the beneficial properties noted above. While the present disclosure focuses somewhat on IG unit embodiments, it is to be understood that the invention extends to any substrate (e.g., a monolithic pane or a flexible sheet) carrying the present low solar reflectance, low-emissivity coating 40.

A first uniquely preferred low solar reflectance, low-emissivity film stack has the following structure: (1) a zinc oxide layer deposited directly upon a glass sheet at a thickness of between about 110 Å and about 150 Å, more preferably between about 117 Å and about 143 Å, and optimally about 130 Å; (2) a titanium layer deposited directly upon this zinc oxide layer at a thickness of between about 111 Å and about 151 Å, more preferably between about 118 Å and about 144 Å, and optimally about 131 Å, wherein an outer portion of this titanium layer is oxidized during deposition of the overlying zinc oxide film in an oxidizing atmosphere; (3) a zinc oxide layer deposited directly upon this titanium layer at a thickness of between about 303 Å and about 411 Å, more preferably between about 321 Å and about 393 Å, and optimally about 357 Å; (4) a silver layer deposited directly upon this zinc oxide layer at a thickness of between about 185 Å and about 251 Å, more preferably between about 196 Å and about 240 Å, and optimally about 218 Å; (5) a titanium layer deposited directly upon this silver layer at a thickness of between about 46 Å and 62 Å, more preferably between about 49 Å and 59 Å, and optimally about 54 Å, wherein an outer portion of this titanium layer is oxidized during deposition of the overlying zinc oxide film in an oxidizing atmosphere; (6) a zinc oxide layer deposited directly upon this titanium layer at a thickness of between 181 Å and about 245 Å, more preferably between about 191 Å and about 235 Å, and optimally about 213 Å; and (7) a silicon nitride layer deposited directly upon this zinc oxide layer at a thickness of between about 34 Å and 46 Å, more preferably between about 36 Å and about 44 Å, and optimally about 40 Å.

A second uniquely preferred low solar reflectance, low-emissivity film stack has the following structure: (1) a zinc oxide layer deposited directly upon a glass sheet at a thickness of between about 108 Å and about 148 Å, more preferably between about 115 Å and about 141 Å, and optimally about 128 Å; (2) a titanium layer deposited directly upon this zinc oxide layer at a thickness of between about 109 Å and about 149 Å, more preferably between about 116 Å and about 142 Å, and optimally about 129 Å, wherein an outer portion of this titanium layer is oxidized during deposition of the overlying zinc oxide film in an oxidizing atmosphere; (3) a zinc oxide layer deposited directly upon this titanium layer at a thickness of between about 300 Å and about 406 Å, more preferably between about 318 Å and about 388 Å, and optimally about 353 Å; (4) a silver layer deposited directly upon this zinc oxide layer at a thickness of between about 183 Å and about 247 Å, more preferably between about 193 Å and about 237 Å, and optimally about 215 Å; (6) a titanium layer deposited directly upon this silver layer at a thickness of between about 53 Å and about 71 Å, more preferably between about 56 Å and about 68 Å, and optimally about 62 Å, wherein an outer portion of this titanium layer is oxidized during deposition of the overlying zinc oxide film in an oxidizing atmosphere; (7) a zinc oxide layer deposited directly upon this titanium layer at a thickness of between about 200 Å and about 270 Å, more preferably between about 211 Å and about 259 Å, and optimally about 235 Å; and (8) a silicon nitride layer deposited directly upon this zinc oxide layer at a thickness of between about 15 Å and 21 Å, more preferably between about 16 Å and about 20 Å, and optimally about 18 Å.

A third uniquely preferred low solar reflectance, low-emissivity film stack has the following structure: (1) a zinc oxide layer deposited directly upon a glass sheet at a thickness of between about 116 Å and 156 Å, more preferably between about 122 Å and about 150 Å, and optimally about 136 Å; (2) a titanium layer deposited directly upon this zinc oxide layer at a thickness of between about 105 Å and about 141 Å, more preferably between about 111 Å and about 135 Å, and perhaps optimally about 123 Å, wherein an outer portion of this titanium layer is oxidized during deposition of the overlying zinc oxide film in an oxidizing atmosphere; (3) a zinc oxide layer deposited directly upon this titanium layer at a thickness of between about 321 Å and about 435 Å, more preferably between about 340 Å and about 416 Å, and optimally about 378 Å; (4) a silver layer deposited directly upon this zinc oxide layer at a thickness of between about 202 Å and about 274 Å, more preferably between about 214 Å and about 262 Å, and optimally about 238 Å; (5) a titanium layer deposited directly upon this silver layer at a thickness of between about 58 Å and about 78 Å, more preferably between about 61 Å and about 75 Å, and optimally about 68 Å, wherein an outer portion of this titanium layer is oxidized during deposition of the overlying zinc oxide film in an oxidizing atmosphere; (6) a zinc oxide layer deposited directly upon this titanium layer at a thickness of between 177 Å and about 241 Å, more preferably between about 188 Å and about 230 Å, and optimally about 209 Å; and (7) a silicon nitride layer deposited directly upon this zinc oxide layer at a thickness of between about 28 Å and 38 Å, more preferably between about 30 Å and about 36 Å, and optimally about 33 Å.

Figure 3:
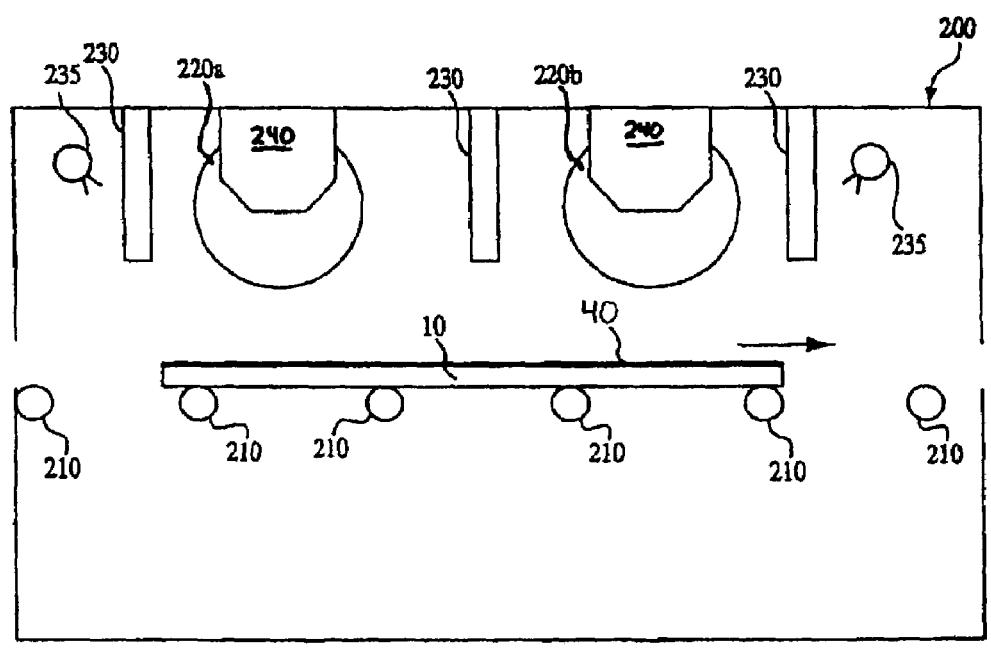
FIG. 3 is a schematic side view of a sputtering chamber that has utility in certain methods of the invention.

The present low solar reflectance coatings 40 can be applied by a variety of well known coating techniques. For example, these coatings can be applied by sputter deposition (i.e., sputtering). Sputtering is well known in the present art. FIG. 3 depicts an exemplary magnetron sputtering chamber 200. Magnetron sputtering chambers and related equipment are commercially available from a variety of sources (e.g., Leybold and BOC Coating Technology). Useful magnetron sputtering techniques and equipment are described in U.S. Pat. No. 4,166,018, issued to Chapin, the entire contents of which are incorporated herein by reference.

In favored methods of the invention, the substrate 10 is coated in a multiple-chamber sputtering line. Sputtering lines are well known in the present art. A typical sputtering line includes a series of sputtering chambers that are aligned and connected such that a sheet-like substrate 10 can be passed from one chamber to the next by conveying the substrate 10 horizontally over spaced-apart transport rollers 210 in each of the chambers. Thus, the rollers 210 form a continuous path of substrate 10 travel through the sputtering line. The substrate 10 is typically conveyed at speeds of between about 100–500 inches per minute.

In one particular deposition method, the substrate 10 is positioned at the inlet of the sputtering line and conveyed into a first coat zone. The first coat zone is provided with three cathodes adapted to deposit the transparent dielectric inner coat 30. All three of these cathodes comprise zinc sputtering targets. The zinc targets 240 in the first coat zone are sputtered in an oxidizing atmosphere to deposit a zinc oxide inner coat 30. This oxidizing atmosphere may consist essentially of oxygen (e.g., about 100% $O_2$). Alternatively, this atmosphere may comprise $Ar/O_2$ (e.g., at about 3.5 mbar). A power of about 37–39 kW is applied to each of the zinc targets, while the substrate 10 is conveyed beneath all three of these targets at a rate of about 475 inches per minute, such that a zinc oxide inner coat 30 is applied at a thickness of about 128 Å.

The substrate 10 is then conveyed into a second coat zone where the high absorption primary layer 80 is applied directly over the inner coat 30. This second coat zone preferably contains an inert atmosphere (e.g., argon at about 4 mbar). One of the sputtering bays in this coat zone has a titanium target. A power of about 68–69 kW is applied to this titanium target, while the substrate is conveyed beneath this target at a rate of about 475 inches per minute, to deposit a titanium high absorption primary layer 80 at a thickness of about 129 Å. The substrate 10 is then conveyed through three subsequent active coat zones to deposit the transparent dielectric middle coat 90, as will now be described.

The thus coated substrate is conveyed through a third coat zone having three sputtering bays each with a zinc target and then through a fourth coat zone also having three sputtering bays each with a zinc target. All six of these zinc targets are sputtered in an oxidizing atmosphere (as described above) to deposit the innermost portion of the middle coat 90. The substrate 10 is conveyed beneath these six targets at a rate of about 475 inches per minute, while a power of about 42–47 kW is applied to each target.

The substrate 10 is then conveyed through a subsequent coat zone containing an oxidizing atmosphere. Two of the sputtering bays in this zone are active and have zinc targets. The substrate is conveyed beneath these targets at a rate of 475 inches per minute, while a power of about 8–9 kW is applied to the first target and a power of about 46 kW is applied to the second target. When the substrate 10 is conveyed beneath these two zinc targets and the previous six zinc targets, a total of about 353 Å of zinc oxide is deposited directly on the titanium high absorption primary layer 80. During deposition of this zinc oxide, the outermost portion of the underlying titanium layer 80 is oxidized, as described above.

The substrate 10 is then conveyed into a further coat zone wherein the infrared-reflective film 150 and the high absorption blocker layer 180 are deposited. This coat zone preferably contains an inert atmosphere (described above). The first two sputtering bays of this coat zone each have a silver target. A power of about 13–14 kW is applied to the first silver target and a power of about 7–8 kW is applied to the second silver target. The substrate 10 is conveyed beneath these two targets at about 475 inches per minute, such that a silver infrared-reflective layer 150 is deposited at a thickness of about 215 Å. The third sputtering bay of this coat zone has a titanium target. A power of about 33 kW is applied to this titanium target, while the substrate 10 is conveyed beneath this target at a rate of about 475 inches per minute, to deposit the high absorption blocker layer 180 at a thickness of about 62 Å. The thus coated substrate is then conveyed through four more active coat zones, wherein the outer coat 120 is applied, as will now be described.

The substrate 10 is conveyed through a subsequent coat zone that includes three sputtering bays each having one zinc target, then through a further coat zone having only one active sputtering bay with a zinc target, and then through yet another coat zone having three active sputtering bays each with one zinc target. Each of these coat zones contains an oxidizing atmosphere. A power of about 33–38 kW is applied to each of the first three zinc targets, a power of about 5 kW is applied to the fourth zinc target, a power of about 31 kW is applied to the fifth zinc target, a power of about 37–38 kW is applied to the sixth zinc target, and a power of about 6 kW is applied to the seventh zinc target. The substrate 10 is conveyed beneath these targets at a rate of about 475 inches per minute, while sputtering each target at the described power level, to deposit about 235 Å of zinc oxide directly over the high absorption blocker layer 180.

The thus coated substrate is then conveyed into a final coat zone wherein the outermost portion of the transparent dielectric outer coat 120 is deposited. This coat zone has two active sputtering bays each with a silicon target (doped with aluminum). A nitriding atmosphere is preferably maintained in this coat zone during sputtering. For example, this atmosphere can be nitrogen at a pressure of about 3.5–5 mbar. A power of about 3–4 kW is applied to the first silicon target, while a power of about 25–26 kW is applied to the second silicon target. The substrate 10 is conveyed beneath these targets at a rate of about 475 inches per minute, while sputtering each target at the described power level, to deposit about 18 Å of silicon nitride directly over the underlying zinc oxide. This completes the low solar reflectance coating 40 of one particular embodiment.

While preferred embodiments of the present invention have been described, it should be understood that numerous changes, adaptations, and modifications can be made therein without departing from the spirit of the invention and the scope of the appended claims.

What is claimed is:

1. A pane bearing a low-emissivity coating comprising, in sequence outwardly from the pane, an inner coat, a high absorption primary layer, a middle coat, an infrared-reflective layer, and an outer coat, the inner coat comprising at least one transparent dielectric film and being applied directly on the pane and having an optical thickness of less than about 272Å, the middle coat comprising at least one transparent dielectric film and having an optical thickness of between about 600 Å and about 872 Å, said infrared-reflective layer comprising material that is highly reflective of infrared radiation and having a thickness of at least about 175 Å, the high absorption primary layer comprising material that is highly absorptive of solar radiation and having a thickness of at least about 100 Å, wherein a major portion of the thickness of the high absorption primary layer is metallic titanium.

2. The pane of claim 1 wherein said infrared-reflective layer comprises silver.

3. The pane of claim 1 wherein the low-emissivity coating includes a high absorption blocker layer directly over said infrared-reflective layer, the high absorption blocker layer having a thickness of between about 46 Å and about 78 Å.

4. The pane of claim 1 wherein the high absorption primary layer has a thickness of between about 110 Å and about 144 Å.

5. The pane of claim 1 wherein each film of the middle coat has a refractive index of between about 1.7 and about 2.4.

6. The pane of claim 1 further comprising a high absorption blocker layer deposited over said infrared-reflective layer, the high absorption blocker layer comprising material that is highly absorptive of solar radiation and having a thickness of at least about 45 Å, wherein the high absorption blocker layer comprises titanium.

7. The pane of claim 6 wherein the high absorption blocker layer is deposited directly over said infrared-reflective layer.

8. The pane of claim 6 wherein a major portion of the thickness of the high absorption blocker layer is metallic titanium.

9. The pane of claim 6 wherein the high absorption blocker layer comprises an outer portion that is titanium oxide.

10. The pane of claim 6 wherein the thickness of the high absorption blocker layer is between about 54 Å and about 68 Å.

11. The pane of claim 1 wherein each film of the inner coat has a refractive index of between about 1.7 and about 2.4.

12. The pane of claim 1 wherein the outer coat comprises a layer of zinc oxide and a layer of silicon nitride over said layer of zinc oxide.

13. The pane of claim 12 wherein each film in the outer coat has a refractive index of between about 1.7 and about 2.4.

14. The pane of claim 1 wherein the pane is part of an insulating glass unit and the low-emissivity coating is carried on a #2 surface of the insulating glass unit.

15. The pane of claim 14 wherein the insulating glass unit has an exterior solar reflectance of less than about 30%.

16. The pane of claim 15 wherein the exterior solar reflectance is less than about 20%.

17. The pane of claim 16 wherein the exterior solar reflectance is about 16%.

18. The pane of claim 1 wherein the low-emissivity coating has an emissivity of less than about 0.07.

19. The pane of claim 18 wherein the emissivity is less than about 0.05.

20. The pane of claim 19 wherein the emissivity is about 0.044.

21. The pane of claim 14 wherein the insulating glass unit has an exterior visible reflectance of less than about 20%.

22. The pane of claim 21 wherein the exterior visible reflectance is less than about 15%.

23. The pane of claim 22 wherein the exterior visible reflectance is about 11%.

24. The pane of claim 14 wherein the insulating glass unit has a U Value of less than about 0.4.

25. The pane of claim 24 wherein the U Value is less than about 0.3.

26. The pane of claim 14 wherein the insulating glass unit has a solar heat gain coefficient of less than about 0.4.

27. The pane of claim 14 wherein the insulating glass unit has a transmitted color characterized by an $a_h$ color coordinate of between about −1.75 and about −4.5 and a $b_h$ color coordinate of between about −2 and about −5.

28. The pane of claim 14 wherein the insulating glass unit has an exterior reflected color characterized by an $a_h$ color coordinate of between about 1.4 and about −1.6 and a $b_h$ color coordinate of between about 0.5 and about −2.5.

29. A pane bearing a low-emissivity coating comprising the following sequence of films:
a) an inner, applied directly to the pane, coat comprising at least one transparent dielectric film and having an optical thickness of less than about 272Å;
b) a high absorption primary layer comprising material that is highly
absorptive of solar radiation and having a thickness of least about 100 Å, wherein a major portion of the thickness of the high absorption primary layer is metallic titanium;
c) a middle coat comprising at least one transparent dielectric film and having an optical thickness of between about 600 Å and about 872 Å;
d) an infrared-reflective layer comprising material that is highly reflective of infrared radiation and having a thickness of at least about 175 Å;
e) a high absorption blocker layer comprising material that is highly absorptive of solar radiation and having a thickness of at least about 45 Å; and
f) an outer coat comprising a layer of zinc oxide and a layer of silicon nitride over said layer of zinc oxide.

30. A pane bearing a low-emissivity coating comprising an infrared-reflective layer, a high absorption primary layer, an inner coat, and a middle coat, the inner coat comprising at least one transparent dielectric film and being deposited directly on the pane, wherein each film of the inner coat has a refractive index of between about 1.7 and about 2.4, said infrared-reflective layer comprising silver and having a thickness of at least about 175 Å, the high absorption primary layer comprising material that is highly absorptive of solar radiation and having a thickness of at least about 100 Å, wherein a major portion of the thickness of the high absorption primary layer is metallic titanium, the middle coat comprising at least one transparent dielectric film and being positioned between said infrared-reflective layer and the high absorption primary layer, wherein the low-emissivity coating includes a high absorption blocker layer directly over said infrared-reflective layer, the high absorption blocker layer having a thickness of at least about 45 Å, wherein the pane is part of an insulating glass unit and the low-emissivity coating is carried on a #2 surface of the insulating glass unit, the insulating glass unit having an exterior solar reflectance of less than about 20% and having a transmitted color characterized by an $a_h$ color coordinate and a $b_h$ color coordinate, both of said color coordinates being negative such that the insulating glass unit has a transmitted hue within a range that is entirely within a blue-green range.

31. The pane of claim 26 wherein the insulating glass unit has a solar heat gain coefficient of less than about 0.2.

32. The pane of claim 31 wherein the insulating glass unit has a solar heat gain coefficient of about 0.16.

33. The pane of claim 1 wherein the outer coat comprises at least one transparent dielectric film and has an optical thickness, the coating having a ratio defined as the optical thickness of the outer coat divided by the optical thickness of the middle coat, said ratio being between about 0.52 and about 0.88.

34. The pane of claim 29 wherein the outer coat has an optical thickness, the coating has a ratio defined as the optical thickness of the outer coat divided by the optical thickness of the middle coat, and said ratio is between about 0.52 and about 0.88.

35. The pane of claim 30 wherein the insulating glass unit has a solar heat gain coefficient of less than about 0.2.

* * * * *